(12) United States Patent
Pizer et al.

(10) Patent No.: US 10,614,580 B1
(45) Date of Patent: Apr. 7, 2020

(54) METHODS, SYSTEMS, AND COMPUTER READABLE MEDIA FOR DERIVING A THREE-DIMENSIONAL (3D) TEXTURED SURFACE FROM ENDOSCOPIC VIDEO

(71) Applicant: The University of North Carolina at Chapel Hill, Chapel Hill, NC (US)

(72) Inventors: Stephen Murray Pizer, Chapel Hill, NC (US); Jan-Michael Frahm, Chapel Hill, NC (US); Julian Gary Rosenman, Chapel Hill, NC (US); Qingyu Zhao, San Mateo, CA (US); Rui Wang, Chapel Hill, NC (US); Ruibin Ma, Durham, NC (US); James True Price, Chapel Hill, NC (US); Miao Fan, Carrboro, NC (US); Sarah Kelly McGill, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 16/241,356

(22) Filed: Jan. 7, 2019

(51) Int. Cl.
*G06K 9/00* (2006.01)
*G06T 7/579* (2017.01)
(Continued)

(52) U.S. Cl.
CPC ............ *G06T 7/33* (2017.01); *G06K 9/00744* (2013.01); *G06T 3/0081* (2013.01); *G06T 3/0093* (2013.01); *G06T 7/20* (2013.01); *G06T 7/507* (2017.01); *G06T 7/579* (2017.01); *G06T 15/08* (2013.01); *G06T 19/20* (2013.01); *G06T 2207/10016* (2013.01); *G06T 2207/10028* (2013.01); *G06T 2207/10068* (2013.01);
(Continued)

(58) Field of Classification Search
None
See application file for complete search history.

(56) References Cited

U.S. PATENT DOCUMENTS

| 2007/0013710 A1* | 1/2007 | Higgins | ............ A61B 1/00147 345/581 |
| 2015/0313503 A1* | 11/2015 | Seibel | ................ A61B 1/00165 600/103 |

(Continued)

OTHER PUBLICATIONS

Kaufman et al., "3D Surface Reconstruction from Endoscopic Videos", Visualization in Medicine and Life Sciences (Year: 2008).*

(Continued)

*Primary Examiner* — Randolph I Chu
(74) *Attorney, Agent, or Firm* — Jenkins, Wilson, Taylor & Hunt P.A.

(57) ABSTRACT

Methods, systems, and computer readable media for deriving a three-dimensional (3D) textured surface from endoscopic video are disclosed. According to one method for deriving a 3D textured surface from endoscopic video, the method comprises: performing video frame preprocessing to identify a plurality of video frames of an endoscopic video, wherein the video frame preprocessing includes informative frame selection, specularity removal, and key-frame selection; generating, using a neural network or a shape-from-motion-and-shading (SfMS) approach, a 3D textured surface from the plurality of video frames; and optionally registering the 3D textured surface to at least one CT image.

18 Claims, 17 Drawing Sheets

(51) Int. Cl.

| | |
|---|---|
| *G06T 7/507* | (2017.01) |
| *G06T 3/00* | (2006.01) |
| *G06T 19/20* | (2011.01) |
| *G06T 7/33* | (2017.01) |
| *G06T 15/08* | (2011.01) |
| *G06T 7/20* | (2017.01) |

(52) U.S. Cl.
CPC .............. *G06T 2207/10081* (2013.01); *G06T 2207/20084* (2013.01); *G06T 2207/20104* (2013.01); *G06T 2207/20221* (2013.01); *G06T 2219/2004* (2013.01)

(56) References Cited

U.S. PATENT DOCUMENTS

| | | | |
|---|---|---|---|
| 2015/0320514 A1* | 11/2015 | Ahn ........................ | A61B 34/30 606/130 |
| 2018/0317740 A1* | 11/2018 | Rossetto .............. | A61B 1/3132 |

OTHER PUBLICATIONS

Schoeffmann et al., "Keyfranne Extraction in Endoscopic Video", Multimedia Tools and Applications (Year: 2015).*

Tavanapong et al., Reconstruction of a 3D Virtual Colon Structure and Camera Motion for Screening Colonoscopy, Medical Research Archives, vol. 5, Issue 6, Jun. 2017 (Year: 2017).*

Wang et al., Improving 3D surface reconstruction from endoscopic video via fusion and refined reflectance modeling, SPIE Medical Imaging, 2017 (Year: 2017).*

Thormaehlen et al. "Three-Dimensional Endoscopy" (Year: 2002).*

Wang et al., "Improving 3D Surface Reconstruction from Endoscopic Video via Fusion and Refined Reflectance Modeling", pp. 1-7 (2017).

Zhao et al., "Orthotropic Thin Shell Elasticity Estimation for Surface Registration", pp. 1-12 (2017).

Ilg et al., "FlowNet 2.0: Evolution of Optical Flow Estimation with Deep Networks", pp. 2462-2470 (Dec. 6, 2016).

Ourselin et al., "Medical Image Computing and Computer-Assisted Intervention—MICCAI 2016", 19th International Conference, Springer, pp. 1-723 (Oct. 17-21, 2016).

Mayer et al., "A Large Dataset to Train Convolutional Networks for Disparity, Optical Flow, and Scene Flow Estimation", pp. 1-14 (Dec. 7, 2015).

Bartoli et al., "Shape-from-Template", IEEE Transaction on Pattern Analysis and Machine Intelligence, vol. 37, No. 10, pp. 2099-2118 (Oct. 2015).

Simonyan et al., "Very Deep Convolutional Networks for Large-Scale Image Recoginition", ICLR Conference Paper, pp. 1-14 (2015).

Zollhöfer et al., "Shading-based Refinement on Volumetric Signed Distance Functions", pp. 1-14 (2015).

Zhao et al., "Surface Registration in the Presence of Missing Patches and Topology Change", pp. 1-6 (2015).

Malti et al., "Combining Conformal Deformation and Cook-Torrance Shading for 3-D Reconstruction in Laparoscopy", IEEE Transactions on Biomedical Engineering, vol. 61, No. 6, pp. 1684-1692 (Jun. 2014).

Mair-Hein et al., "Optical techniques for 3D surface reconstruction in computer-assisted laparoscopic surgery", pp. 1-58 (2013).

Zeng et al., "A Generic Deformation Model for Dense Non-Rigid Surface Registration: a Higher-Order MRF-based Approach", pp. 3360-3367 (2013).

Tokgozoglu et al., "Color-Based Hybrid Reconstruction for Endoscopy", IEEE Computer Society Conference on Computer Vision and Pattern Recognition Workshops, pp. 8-15 (2012).

Malti et al., Template-Based Conformal Shape-from-Motion from Registered Laparoscopic Images, pp. 1-5 (2012).

Malti et al., Template-Based Conformal Shape-from-Motion-and-Shading for Laparoscopy, pp. 1-10 (2012).

Wu, et al. "Shading-based Dynamic Shape Refinement from Multi-view Video under General Illumination", Conference Paper, IEEE International Conference on Computer Vision, pp. 1-9 (Nov. 2011).

Bauer et al., "A New Riemannian Setting for Surface Registration", pp. 182-193 (2011).

Han et al., "High Quality Shape from a Single RGB-D Image under Uncalibrated Natural Illumination", pp. 1-8 (2010).

Salzmann et al., "Deformable Surface 3D Reconstruction from Monocular Images", pp. 1-104 (2010).

Zaharescu et al., "Surface Feature Detection and Description with Applications to Mesh Matching", CVPR—IEEE International Conference on Computer Vision and Pattern Recognition, pp. 1-9 (Jun. 2009).

Sun et al., "A Concise and Provably Informative Multi-Scale Signature Based on Heat Diffusion", Eurographics Symposium on Geometry Processing, vol. 28, No. 5, pp. 1-10 (2009).

Durou et al., "Numerical methods for shape-from-shading: A new survey with benchmarks", Computer Vision and Image Understanding, Elsevier, pp. 22-43 (2008).

Ahmed et al., "A New Formulation for Shape from Shading for Non-Lambertian Surfaces", IEEE Computer Society Conference on Computer Vision and Pattern Recognition (CVPR '06), pp. 1-8 (2006).

Paragios et al., "Handbook of Mathematical Models in Computer Vision", Springer, pp. 1-612 (2006).

Bronstein et al., "Generalized multidimensional scaling: A framework for isometry-invariant partial surface matching", pp. 1168-1172 (Dec. 5, 2005).

Gatzke et al., "Curvature Maps for Local Shape Comparison", pp. 1-9 (Jul. 2005).

Prados et al., "Shape from Shading: a well-posed problem?", IEEE Conference on Computer Vision and Pattern Recognition, CVPR, pp. 870-877 (Jun. 2005).

Gu et al., "Genus Zero Surface Conformal Mapping and Its Application to Brain Surface Mapping", IEEE Transactions on Medical Imaging, vol. 23, No. 8, pp. 949-958 (Aug. 2004).

Elad et al., "On Bending Invariant Signatures for Surfaces", IEEE Transactions on Pattern Analysis and Machine Intelligence, vol. 25, No. 10, pp. 1285-1295 (Oct. 2003).

Kao et al., "Lax-Friedrichs Sweeping Scheme for Static Hamilton-Jacobi Equations", pp. 1-35 (Aug. 1, 2003).

Kim et al., "Pharyngeal Pressure Analysis by the Finite Element Method During Liquid Bolus Swallow", pp. 585-589 (2000).

Zhang et al., "Shape from Shading: A Survey", IEEE Transactions on Pattern Analysis and Machine Intelligence, vol. 21, No. 8, pp. 690-706 (Aug. 1999).

Thirion, "Image matching as a diffusion process: an analogy with Maxwell's demons", Medical Image Analysis, Elsevier, pp. 243-260 (1998).

Koenderink et al., "Bidirectional Reflection Distribution Function expressed in terms of surface scattering modes", pp. 1-2 (1996).

Schwab et al., "Dynamic imaging of the upper airway during respiration in normal subjects", The American Physiological Society, pp. 1504-1514 (1993).

Cook et al., "A Reflectance Model for Computer Graphics", AMC Transactions on Graphics, vol. 1, No. 1, pp. 7-24 (Jan. 1982).

Horn, "Shape from Shading: A Method for Obtaining the Shape of a Smooth Opaque Object from One View", pp. 1-198 (Nov. 1970).

Schöps et al., "SurfelMeshing: Online Surfel-Based Mesh Reconstruction," IEEE Transactions on Pattern Analysis and Machine Intelligence, pp. 1-13 (Oct. 1, 2018).

Wang et al., Recurrent Neural Network for Learning Dense Depth and Ego-Motion from Video, University of North Carolina at Chapel Hill, pp. 1-18 (May 17, 2018).

Engel et al., "Direct Sparse Odometry," IEEE Transactions on Pattern Analysis and Machine Intelligence vol. 40 No. 3, pp. 611-625 (Mar. 2018).

Yin et al., "GeoNet: Unsupervised Learning of Dense Depth, Optical Flow and Camera Pose," CVPR paper, Computer Vision Foundation, pp. 1983-1992 (2018).

Tateno et al., "CNN-SLAM: Real-time dense monocular SLAM with learned depth prediction," CVPR paper, Computer Vision Foundation, pp. 6565-6574 (Jul. 2017).

(56) References Cited

OTHER PUBLICATIONS

Zhou et al., "Unsupervised Learning of Depth and Ego-Motion from Video," CVPR paper, Computer Vision Foundation, pp. 1851-1860 (2017).
Schönberger et al., "Structure-from-Motion Revisited," CVPR paper, Computer Vision Foundation, pp. 4104-4113 (2016).
Mur-Artal et al., "ORB-SLAM: A Versatile and Accurate Monocular SLAM System," IEEE Transactions on Robotics, pp. 1-18 (Sep. 18, 2015).
Hong et al., "3D Reconstruction of virtual colon structures from colonoscopy images," Computerized Medical Imaging and Graphics, pp. 22-33 (2014).
Engel et al., "LSD-SLAM: Large-scale Direct Monocular SLAM," Technical University Munich, pp. 1-16 (2014).
Jemal et al., "Global Patterns of Cancer Incidence and Mortality Rates and Trends," Cancer Epidemiology, Biomarkers & Prevention, pp. 1893-1907 (2010).
Hong et al., "Colonoscopy Simulation," SPIE, pp. 1-9 (2007).
Rijn et al., "Polyp Miss Rate Determined by Tandem Colonoscopy: A Systematic Review," American Journal of Gastroenterology, pp. 343-350 (2006).
Ex Parte Quayle Action for U.S. Appl. No. 15/513,632 (dated Dec. 9, 2019).

\* cited by examiner a) Good Frames  b) Bad Frames

600

| | TOTAL FRAMES | INFORMATIVE FRAMES | KEY-FRAMES | PERCENTAGES |
|---|---|---|---|---|
| Case 1 | 7248 | 1429 | 408 | 5.6% |
| Case 2 | 4974 | 2963 | 420 | 8.4% |
| Case 3 | 5122 | 2458 | 374 | 7.3% |
| Case 4 | 7522 | 3106 | 882 | 11.7% |
| Case 5 | 3682 | 2007 | 336 | 9.1% |
| Average | 5709.6 | 2392.6 | 484 | 8.5% |

FIG. 6

METHODS, SYSTEMS, AND COMPUTER READABLE MEDIA FOR DERIVING A THREE-DIMENSIONAL (3D) TEXTURED SURFACE FROM ENDOSCOPIC VIDEO

GOVERNMENT INTEREST

This invention was made with government support under Grant No. CA158925 awarded by the National Institutes of Health of the United States. The government has certain rights in the invention.

TECHNICAL FIELD

The subject matter described herein relates to three-dimensional (3D) surface modeling. More specifically, the subject matter relates to methods, systems, and computer readable media for deriving a 3D textured surface from endoscopic video.

BACKGROUND

Endoscopy enables high-resolution visualization of tissue texture and geometry and is a critical step in many clinical workflows, including diagnosis and treatment planning for cancers in the nasopharynx. For example, nasopharyngoscopy is a commonly used technique for nasopharyngeal cancer diagnosis and treatment planning. For radiotherapy, the planning requires tumor localization. Although nasopharyngoscopy can provide a direct, high-contrast, high-resolution visualization of a patient's interior tissue surface, it has a weakness for tumor localization in that it does not provide precise 3D spatial information. Thus, an endoscopic video does not provide its information in 3D space, making it difficult to use in tumor localization, and it is inefficient to review.

SUMMARY

Methods, systems, and computer readable media for deriving a three-dimensional (3D) textured surface from endoscopic video are disclosed. According to one method for deriving a 3D textured surface from endoscopic video, the method comprises: performing video frame preprocessing to identify a plurality of video frames of an endoscopic video, wherein the video frame preprocessing includes informative frame selection, specularity removal, and key-frame selection; generating, using a neural network or a shape-from-motion-and-shading (SfMS) approach, a 3D textured surface from the plurality of video frames; and optionally registering the 3D textured surface to at least one CT image.

A system for deriving a 3D textured surface from endoscopic video is also disclosed. The system includes at least one processor and an endoscopogram generation (EG) module executable by the at least one processor. The EG module is configured for: performing video frame preprocessing to identify a plurality of video frames of an endoscopic video, wherein the video frame preprocessing includes informative frame selection, specularity removal, and key-frame selection; generating, using a neural network or a shape-from-motion-and-shading (SfMS) approach, a 3D textured surface from the plurality of video frames; and optionally registering the 3D textured surface to at least one CT image.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to at least one physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 6 shows the number and percentage of key-frames selected in five cases using a key-frame selection technique;

DETAILED DESCRIPTION

The subject matter described herein relates to methods, systems, and computer readable media for deriving a 3D textured surface from endoscopic video. In accordance with some aspects of the subject matter described herein, a new imaging approach, referred to herein as endoscopography, can be implemented and utilized to generate a 3D textured surface from endoscopic (e.g., 2D) video. For example, endoscopography may reconstruct a full 3D textured surface, referred to herein as an endoscopogram, from an endoscopic video. Endoscopograms and related techniques open the door for novel 3D visualizations of patient anatomy derived solely from endoscopic data. Further, information contained in the tissue texture in the endoscopogram can be transferred to 3D imaging, such as computed tomography (CT) images, via a surface-to-surface registration. For example, via an interactive tool, a physician can draw directly on the endoscopogram surface to specify a tumor, which then can be automatically transferred to CT slices to aid tumor localization. The subject matter described herein includes various methods, techniques, and mechanisms usable for achieving this goal.

I. Introduction

There exists a variety of endoscopic examinations, and for each of these a reconstruction from the video into a 3D textured surface can be useful. Various applications, including for nasopharyngoscopy and colonoscopy, exist for reconstructed 3D textured surfaces from endoscopic video. For example, various methods with respect to nasopharyngoscopy and colonoscopy applications are disclosed herein.

Nasopharyngoscopy is a commonly used technique for nasopharyngeal cancer diagnosis and treatment planning. For radiotherapy, the planning requires tumor localization. Although nasopharyngoscopy can provide a direct, high-contrast, high-resolution visualization of a patient's interior tissue surface, it has a weakness for tumor localization in that it does not provide precise 3D spatial information. On the other hand, CT provides many critical sources of information needed in planning radiotherapy, with low distortion. However, it provides relatively low contrast and low resolution images for localization of the tumor, especially for tumors predominantly on the tissue surface, as is common in throat cancer.

Therefore, the advantage of tissue information in nasopharyngoscopy can be leveraged together with the 3D geometry information in CT scan, the accuracy of tumor localization will be increased. One challenge is to develop technologies enabling physicians to efficiently review nasopharyngoscopies and to visualize endoscopic data directly in the CT space.

To achieve these objectives, the 2D endoscopic video may be converted into a format that 1) summarizes the overall anatomy as a single object that is easy to manipulate and 2) contains the shape information necessary for registration to the 3D patient space.

Figure 1:
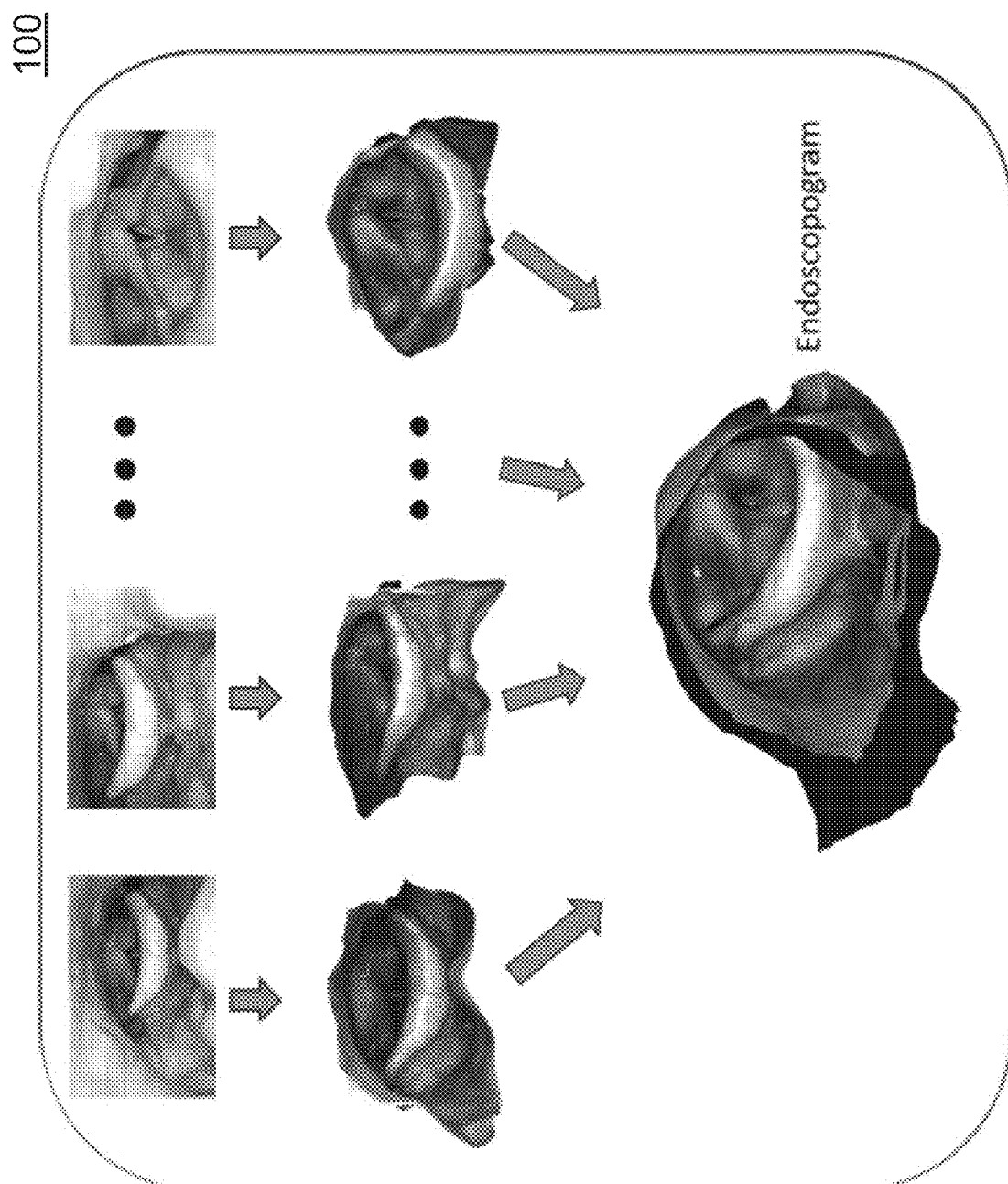
FIG. 1 is a diagram illustrating an endoscopogram generated through frame-by-frame three-dimensional (3D) reconstruction and group-wise deformable registration.

FIG. 1 is a diagram illustrating an endoscopogram generated through frame-by-frame three-dimensional (3D) reconstruction and group-wise deformable registration. Referring to FIG. 1, given an input endoscopic video sequence, a throat surface is reconstructed as a textured 3D mesh (see FIG. 1), also referred to herein as an endoscopogram. The endoscopogram is generated by first reconstructing a textured 3D partial surface for each frame. Then these multiple partial surfaces are fused into an endoscopogram using a group-wise surface registration algorithm and a seamless texture fusion from the partial surfaces. Finally, the endoscopogram geometry is registered with the surface extracted or identified from CT which enables the desired tumor transfer process.

Colonoscopy is a commonly used technique for detecting changes or abnormalities in the large intestine (colon) and rectum. Using aspects described herein, given an input endoscopic video sequence, a colon surface is reconstructed as a textured 3D mesh (see FIG. 3), also referred to herein as an endoscopogram. The endoscopogram is generated by first reconstructing a textured 3D partial surface for each frame. Then these multiple partial surfaces are fused into an endoscopogram using a group-wise surface registration algorithm and a seamless texture fusion from the partial surfaces. Additional details regarding the colonoscopy application is described below.

The subject matter described herein is organized as follows: Section II gives an overview of the problem and challenges for the proposed methodology. Section III presents related work and provides background on tools utilized in the methods described herein. Section IV describes details of various aspects of an example approach for deriving an endoscopogram. For example, section IV discloses technical details of an example method for frame-by-frame depth reconstruction of individual endoscopic video frames, the group-wise geometry fusion of multiple partial reconstructions, their seamless texture fusion, and the registration between the endoscopogram and CT.

II. Overview

A. Challenges

Reconstructing 3D surface geometry from 2D endoscopic video and registration with the surface extracted from CT is very challenging. For example in the nasopharyngoscopy, the environment for 3D reconstruction is unknown because throat texture and shape can vary greatly from patient to patient, especially when tumors are present. Further, due to the presence of the endoscope, the throat constantly has sudden large deformations caused by the gag reflex and swallowing [1], [2]. Moreover, the specularities (e.g., the "shiny, light-reflective areas") of the saliva-coated throat tissue and the self-occlusions of different inner structures make the reconstruction even harder.

Registration of an endoscopogram with a surface extracted or identified from CT must deal with 1) the partial volume effect of CT, which leads to topology differences between CT and endoscopogram; 2) some anatomy not appearing in the camera view, which leads to missing data in the endoscopogram; and 3) the different patient postures during CT and endoscopy procedure, which causes large deformation between the CT and endoscopogram.

Considering all these factors, a successful technique for endoscopogram construction may operate over short subsequences of the input endoscopic video without any a priori assumptions of the underlying shape, and the registration between the CT and endoscopogram must handle large deformation, missing patches and topology differences.

B. System Overview

Figure 2:
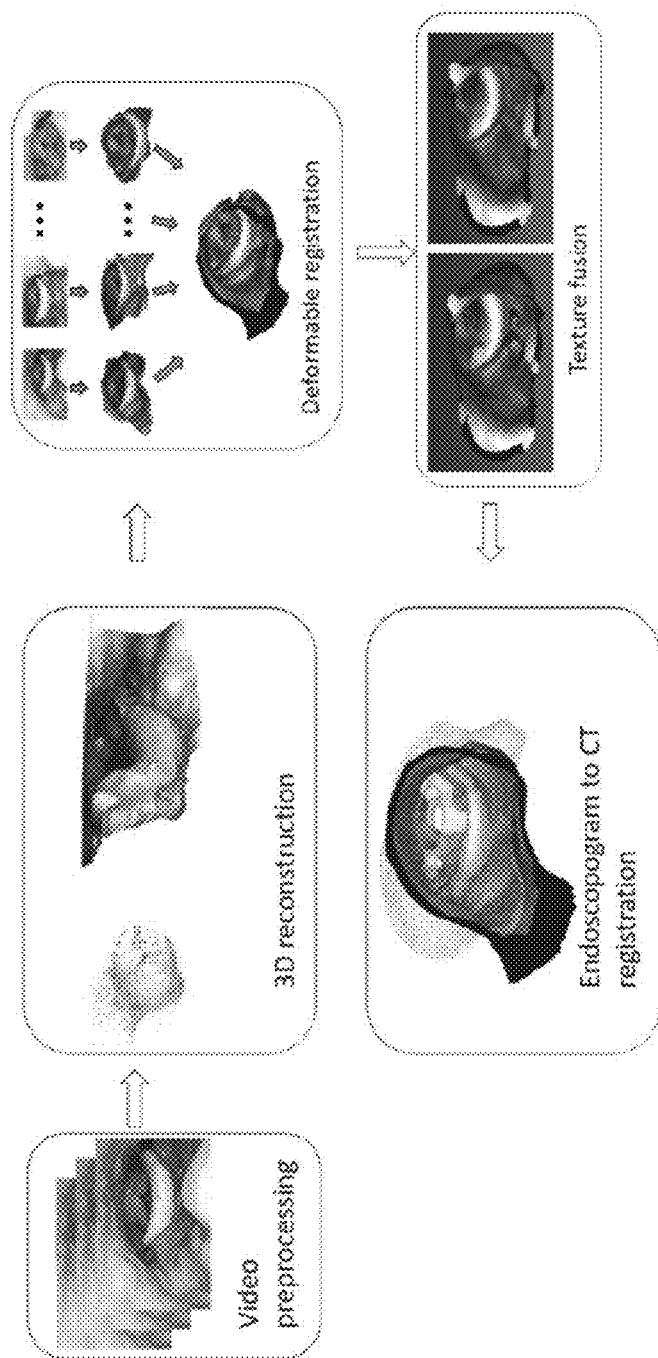
FIG. 2 is a diagram illustrating an overview of a system for deriving an endoscopogram and performing registration of the endoscopogram to a computed tomography (CT) image.

FIG. 2 is a diagram illustrating an overview of a system 200 for deriving an endoscopogram and performing registration of the endoscopogram to a CT image. In system 200, an approach involving video preprocessing, 3D reconstruction, deformable registration, texture fusion, and endoscopogram to CT registration is depicted. Video preprocessing may include preprocessing a series of automatic video frames, which may utilize deep learning based automatic informative frame selection, specularity removal, and a key-frame selection.

After video preprocessing, a 3D reconstruction of a throat surface may be performed using the preprocessed images. In some embodiments, the 3D reconstruction may utilize sparse, multi-view data obtained via Structure-from-Motion (SfM) to guide Shape-from-Shading (SfS) reconstruction of the throat surface in individual frames. In some embodiments, novel improvements to the feature extraction and correspondence detection in SfM, and the formulation of SfS together with a new reflectance model may also introduced and utilized.

In some embodiments, the 3D reconstruction may utilize a recurrent neural network (RNN) based depth estimation method that implicitly models the complex tissue reflectance property and performs depth estimation and camera pose estimation in real-time. For example, the RNN based depth estimation method may implemented as DenseSLAMNet. the DispNet architecture may be utilized in DenseSLAM-Net. In the DenseSLAMNet, multiple views are incorporated into the single frame depth estimation through RNN. A temporal window of size t=10 may be used during training: every ten consecutive frames are grouped into one training sample and fed to the DenseSLAMNet sequentially. Once the network is trained, video frames can be fed to it sequentially and the DenseSLAMNet will output the dense depth map and relative camera pose for each input frame.

After 3D reconstruction, a group-wise surface registration algorithm based on N-body interaction and physics-motivated modeling may be applied. A related surface registration algorithm, based on a surface-to-surface registration method called Thin Shell Demons (TSD), is described in detail in [3]. In some embodiments, the group-wise surface registration algorithm may be improved by the estimation of nonuniform and anisotropic elasticity parameters using orthotropic physical modeling [4].

After performing group-wise surface registration, texture fusion may be performed to combine both the geometry and texture from multiple partial reconstructions. For example, a number of texture maps derived from various frames of an endoscopic video may indicate texture but avoids dramatic color differences caused by various issues (e.g., illumination (light binding with camera), reflection, and surface deformation). In this example, texture fusion may involve an iterative process for fusing the texture maps acquired from different views to create a seamless texture. Additional details regarding texture fusion is discussed below.

The registration between the endoscopogram and CT must handle a large deformation and the fact that both the endoscopogram and the surface extracted from CT have missing patches and topology differences. For this purpose, a novel method may be utilized that combines TSD and estimation of the missing patches.

III. Related Work

Aspects of the subject matter described herein are related to the problems of 3D reconstruction and non-rigid registration in the literature.

A. 3D Reconstruction

To date, most work on combining motion-based reconstruction with shading information has utilized shading to augment an existing shape template or model priors [5]. Wu et al. [6] proposed to first build coarse-scale dynamic models from multi-view video and then leverage shading appearance to estimate fine-scale, temporally varying geometry. Fine-scale shading correction has also been used to refine dense surfaces obtained via depth sensor [7], [8]. In endoscopic applications, a related method by Tokgozoglu et al. [9] used multi-view stereo to derive a low-frequency model of the upper airway, then applied Lambertian SfS on albedo-normalized images to endow the existing surface with higher-resolution shape. For monocular reconstruction of deforming environments, several efforts have been made to extend the Shape-from-Template problem [10] to utilize shading information. In [11], [12], [13], Malti, Bartoli, and Collins proposed a two-stage approach for surgery of the uterus: Pre-surgery, an initial 3D template is recovered under rigid scene assumptions, and reflectance parameters are estimated for the surface. In surgery, the deforming surface is recovered via conformal deformations of the template surface, and subsequent shading refinement is performed using the estimated reflectance model. A problem related to dense reconstruction in conditions where dense shape templates are unavailable or difficult to derive is addressed herein. Laryngoscopy is a good example of this (FIG. 7) because the anatomic shapes in this region are highly patient-specific, and surfaces extracted from, for example, CT scans are typically low-resolution and have a notably different shape compared to endoscopy. Multi-view stereo also tends to fail in this scenario, as the combination of strong illumination changes and limited non-deforming image sequences is prohibitive. Motivated by the observation that SfM works over short temporal sequences for these data, a method is developed for dense single-view surface estimation that leverages sparse 3D geometry obtained from SfM.

B. Non-Rigid Surface Registration

Non-rigid 3D registration has been a common topic in medical image analysis. In particular, non-rigid surface registration methods may be interesting for medical image analysis purposes.

Surface embedding (e.g., embedding a surface into a 3D space) is one class of surface registration methods. [14], [15] proposed a multidimensional scaling embedding method that can place the two surface vertices in a low-dimensional Euclidean space, where the nearest-neighbor matching method can be performed to yield the correspondences. Gu et al. [16] proposed to use conformal mapping with angle-preserving constraint to embed the surfaces into a common disc or sphere domain. However, such methods can require the surfaces to have the same intrinsic geometry that it cannot handle surface topology change or missing patches.

Matching-based methods [17], [18], [19] use hand-crafted feature descriptors to perform feature matching, which produce a set of corresponding points. However, without any regularization the outliers produced in the feature matching will lead to non-smooth or even incorrect deformations. Zeng et al. [20] proposed to use MRF to regularize the deformation field. LDDMM [21] has provided an elegant mathematical framework that produces diffeomorphic deformations between surfaces by comparing their normal fields.

Thirion et al. [22] proposed a Demons algorithm which optimize a per pixel wise displacement field. The forces that apply on each pixel were inspired from the optical flow equations. The idea of the Demons algorithm is appealing because it has no assumptions about the surface properties.

IV. Methods

In some embodiments, an example process for deriving an endoscopogram from endoscopic video and perform registration of the endoscopogram to CT images may involve a number of steps, techniques, algorithms, or portions. For example, such a process may include video frame preprocessing (A), temporally local 3D reconstruction (B), a recurrent neural network (RNN) based 3D reconstruction (C), deformable surface registration (D), fusion-guided SfMS (E), seamless texture fusion (F), and endoscopogram to CT Registration (G).

A. Video Frame Preprocessing

An example 3D reconstruction algorithm for deriving an endoscopogram may require consecutive and clear views of the target surface. In some embodiments, a 3D reconstruction algorithm may use an automatic video frame preprocessing pipeline that utilizes three stages or aspects: 1) informative frame selection; 2) specularity removal; and 3) key-frame selection. These stages may be usable to fully automate the video frame preprocessing pipeline and improve efficiency from conventional video frame preprocessing.

1) Informative frame selection: Endoscopic video contains a large fraction of non-informative frames. Non-informative frames include frames with the following properties: tissue surface being obscured by fecal matter (in colonoscopic video), motion blur, the camera being too close to the tissue surface, water flushing (in colonoscopic video), etc. Explicitly extracting features and training classifiers to identify these various kinds of non-informative frames is very difficult. A deep learning method, on the other hand, can directly learn from raw images to distinguish informative frames from non-informative frames without the need of manually crafted features. As such, a deep learning method (e.g., a trained neural network) is very suitable for this task.

Figure 3:
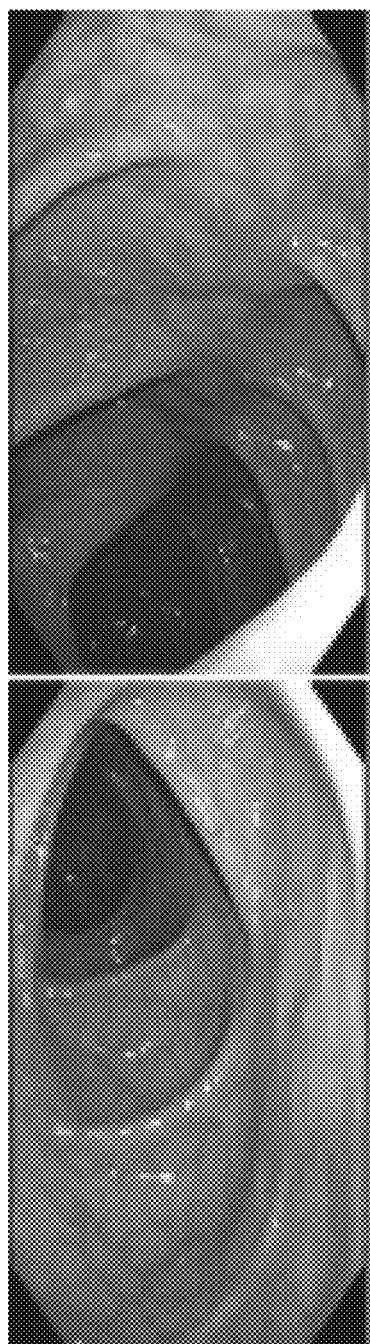
FIG. 3 is a diagram illustrating example informative frames and noninformative frames in a colonoscopic video.
Figure 3:
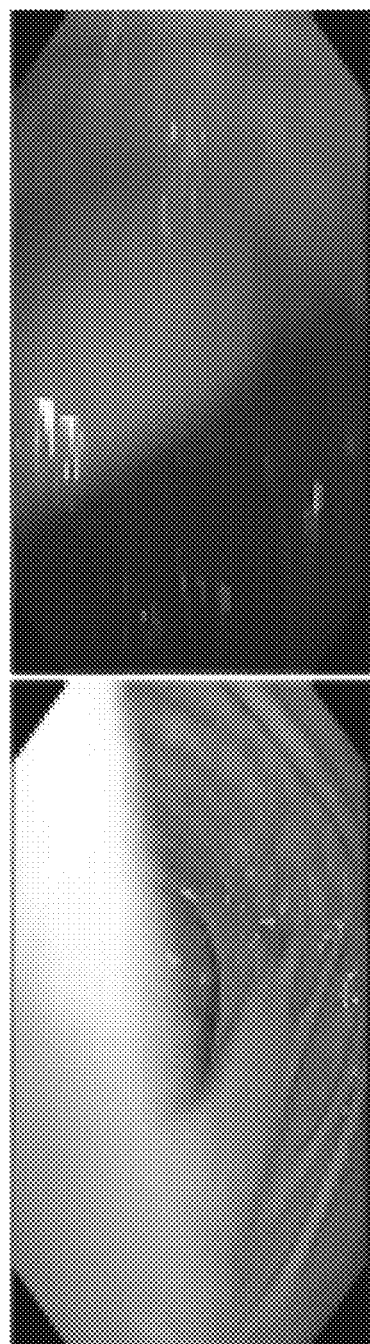

FIG. 3 is a diagram illustrating example informative frames (also referred to as "good" frames) and non-informative frames (also referred to as "bad" frames) in a colonoscopic video. Distinguishing informative frames from non-informative frames is a binary classification problem (e.g., 'true' or 'false' or '1' or '0'). In some embodiments, a deep learning or neural network may be used that utilizes the VGG16 [23] network architecture or other network architectures, such as GoogleNet or ResNet, for distinguishing informative frames from non-informative frames. The input to the neural network may be a single RGB frame, and the output may be its probability of being an informative-frame. To train the neural network, thousands of frames from multiple patients may be divided (e.g., by a human operator or an algorithm) into two classes (informative or non-informative) for training data. After training, the trained model can achieve high accuracy, e.g., 98.6% accuracy at detecting informative frames from a group of frames.

2) Specularity removal: Specular points are very common in endoscopic videos because the light source is very close to the tissue surface. Moreover, because the surface is moist, the specularities are quite intense. Specularity causes problems in 3D reconstruction, including incorrect feature detection and matching and saturated shading information. A deep learning-based specularity removal method is disclosed herein that can remove specular points in real time.

Figure 4:
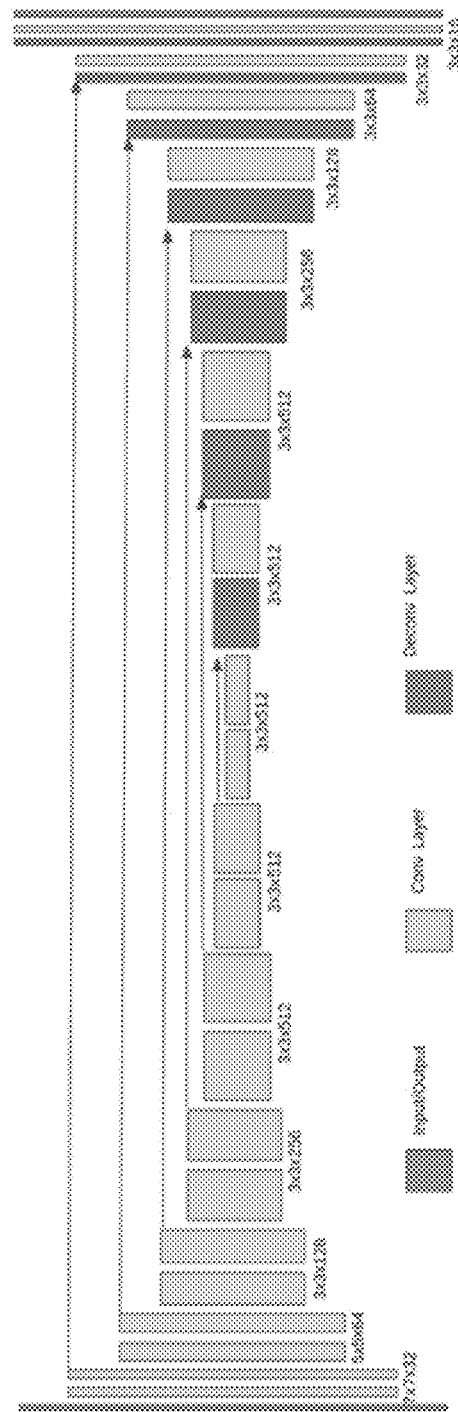
FIG. 4 is a diagram illustrating a DispNet architecture for specularity removal from video frames.

FIG. 4 is a diagram illustrating an example DispNet [24] architecture for performing specularity removal in video frames. In some embodiments, the DispNet architecture may have an encoder-decoder architecture as shown in FIG. 4. In some embodiments, the input and output of the DispNet architecture may have the same size and number of channels.

In some embodiments, training data for the DispNet architecture may be generated such that by using some of its functions the specular points in endoscopic images can be manually removed. For example, 256 manually generated frames may be used as training data for training the DispNet architecture to perform specularity removal.

Figure 5:
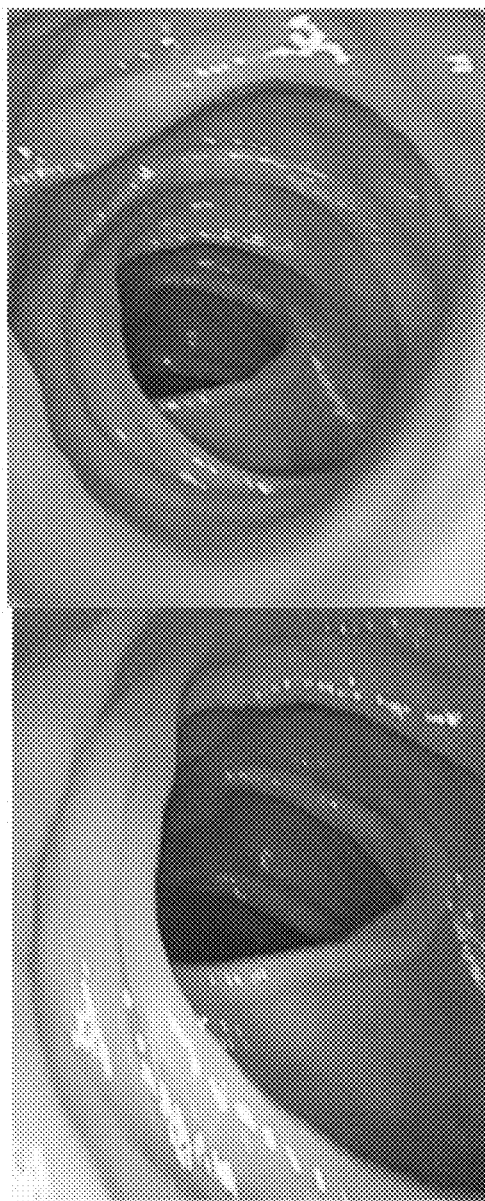
FIG. 5 shows specularity removal results of a DispNet neural network architecture.
Figure 5:
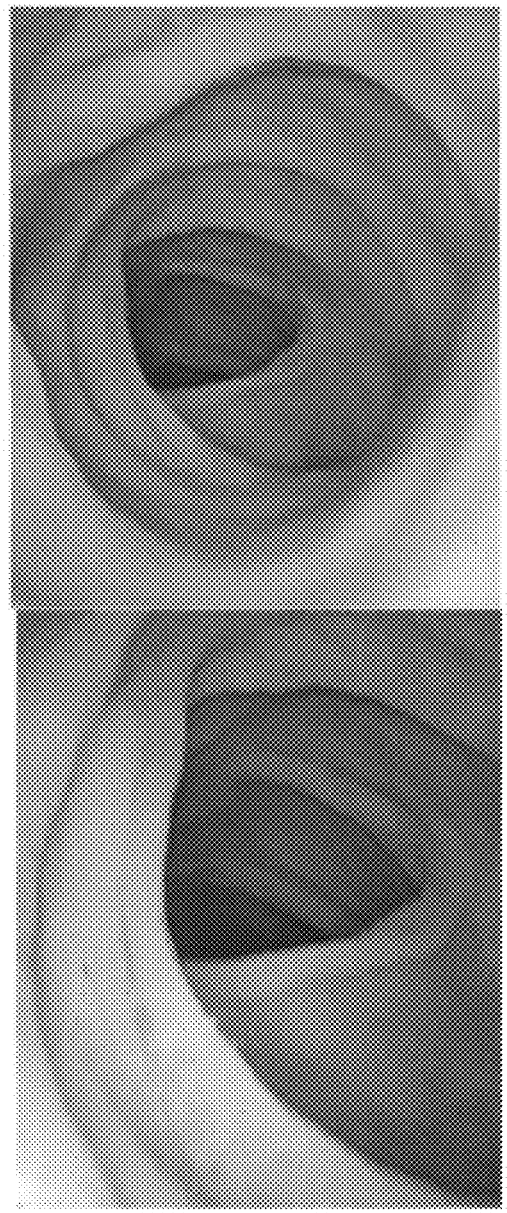

FIG. 5 shows specularity removal results of a DispNet neural network architecture. In FIG. 5, the top images are unaltered images that include specularities and the bottom images are altered images with specularities removed.

3) Key-frame selection: SfM, which provides an estimation of the 3D point positions and the camera locations, may be useful to performing an accurate 3D reconstruction using an example 3D reconstruction method described herein. However, performing SfM on the whole video is very time-consuming because of the large number of frames. Further, chronologically close frames contain almost the same contents, which can result in ambiguity in the step of triangulation in SfM. Moreover, in some stable time domains, having many redundant frames can hide the most informative moving scenes from being reconstructed. Therefore, a key-frame selection technique may be needed to exclude redundant frames and keep informative moving frames.

In some embodiments, an example key-frame selection technique may include three components: sorting, scoring, and inspecting. For example, an example key-frame selection technique may:

1) Sort the frames according to their sharpness. For example, sharpness may be determined by the integral of the square of the magnitude of the color gradients.
2) Define a motion score between two images using optical flow and the normalized correlation coefficient (NCC). For example, an optical flow vector field may be calculated by Flownet2.0 [25], and one of the two images may be warped to the other one. Afterwards, the NCC may be calculated between the warped image and the target image (e.g., only taking into account the pixels that have correspondence).
3) Inspect each frame from low sharpness to high sharpness. For example, if the motion score between its remaining chronological neighbors is less than a threshold, the frame may be considered unnecessary to build up connection and may be deleted from the time sequence. Otherwise, the frame may be taken as a key-frame.

FIG. 6 shows the number and percentage of key-frames selected in five cases using a key-frame selection technique as described above. As shown in FIG. 6, the average percentage of informative frames of total frames is less than 10% (8.5%).

B. Temporally Local 3D Reconstruction

Temporally local 3D reconstruction may include recovering depth information separately for selected images or frames from an input video sequence. In some embodiments, to recover depth information separately for the selected images, an example temporally local 3D reconstruction approach may utilize aspects of Structure-from-Motion (SfM) and Shape-from-Shading (SfS) methods, such an approach is referred to herein as Structure-from-Motion-and-Shading (SfMS), can be used.

In some embodiments, an example temporally local 3D reconstruction approach may include a new SfS framework that utilizes the sparse, but accurate, 3D point data obtained via SfM. Various contributions of the present subject matter are disclosed herein related to this approach that can provide enhanced depth estimation: For example, a regularized formulation of an SfS framework that allows for a trade-off between predicted image intensity and similarity to an existing estimated surface may be utilized. In this example, a way to account for errors along occlusion boundaries in the image using intensity-weighted finite differences may be leveraged. Second, a general reflectance model (e.g., a parameterized model with parameters estimated at each iteration) is proposed for more accurately capturing real-world illumination conditions. Finally, an iterative update scheme may be used that (1) warps an estimated surface to the SfM point cloud, (2) estimates a reflectance model using this warped surface and the given image, and (3) produces a new estimated surface using the regularized SfS framework.

Figure 7:
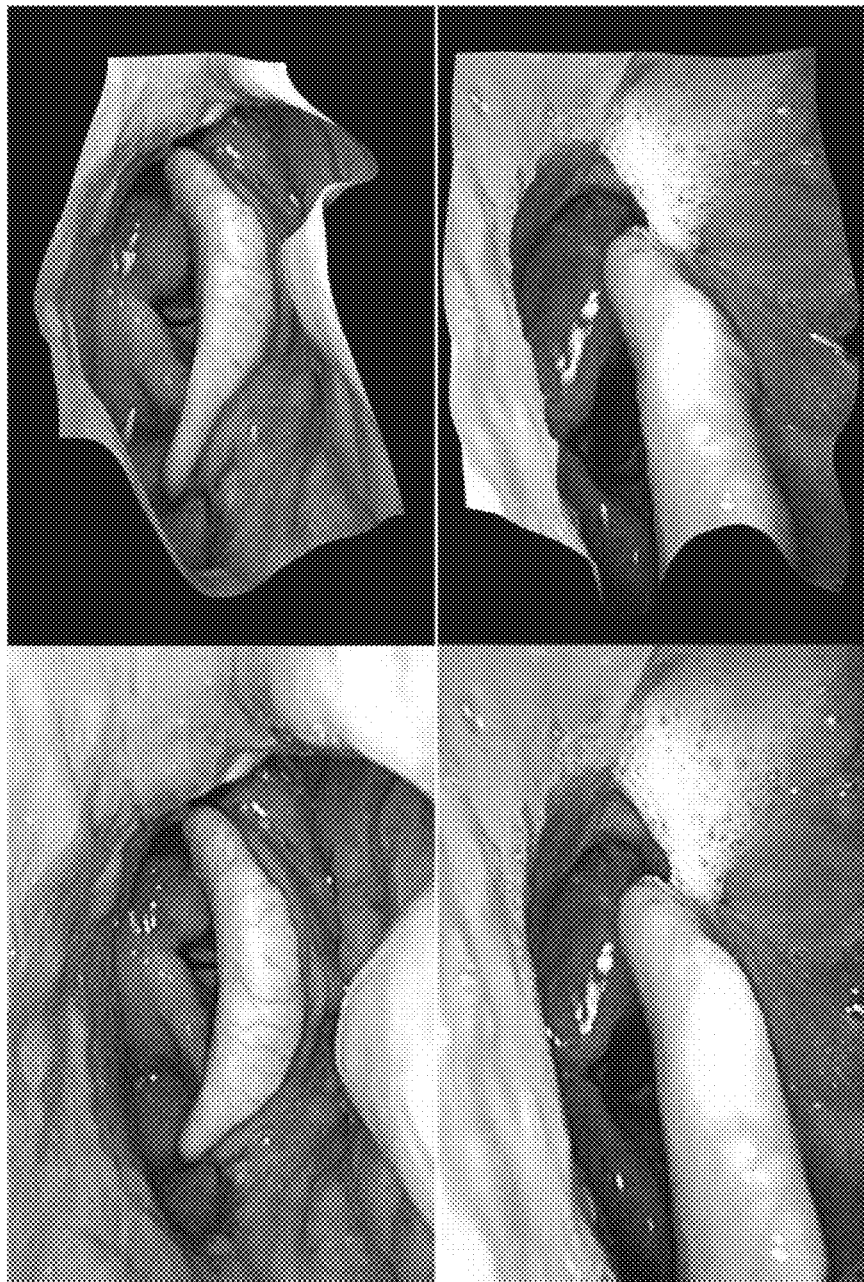
FIG. 7 is a diagram illustrating results of an Structure-from-Motion-and-Shading (SfMS) reconstruction method involving endoscopic video for two different patients.

FIG. 7 is a diagram illustrating results of an SfMS reconstruction method involving endoscopic video for two different patients. In FIG. 7, each row represents a separate endoscopic video, where each left image is an original (e.g., unaltered) image and each right image depicts a surface estimated using an example SfMS reconstruction method according to aspects described herein.

SfM and SfS. An example SfMS framework or method may be based on two classical methods: SfM and SfS. SfM [26], [13], [12] is the simultaneous estimation of camera motion and 3D scene structure from multiple images taken at different viewpoints. Typical SfM methods produce a sparse scene representation by first detecting and matching local features in a series of input images, which are the individual frames of the endoscope video in the application described herein. Then, starting from an initial two-view reconstruction, these methods incrementally estimate both camera poses (rotation and position for each image) and scene structure. The scene structure is parameterized by a set of 3D points projecting to corresponding 2D image features. One point of interest to the generality of the SfMS framework is that sparse non-rigid reconstruction in medical settings is an unsolved problem [2]. However, the approach described herein can handle any sparse data as input, so the approach could easily be integrated with non-rigid SfM formulations that produce time-dependent sparse 3D geometry.

Figure 8:
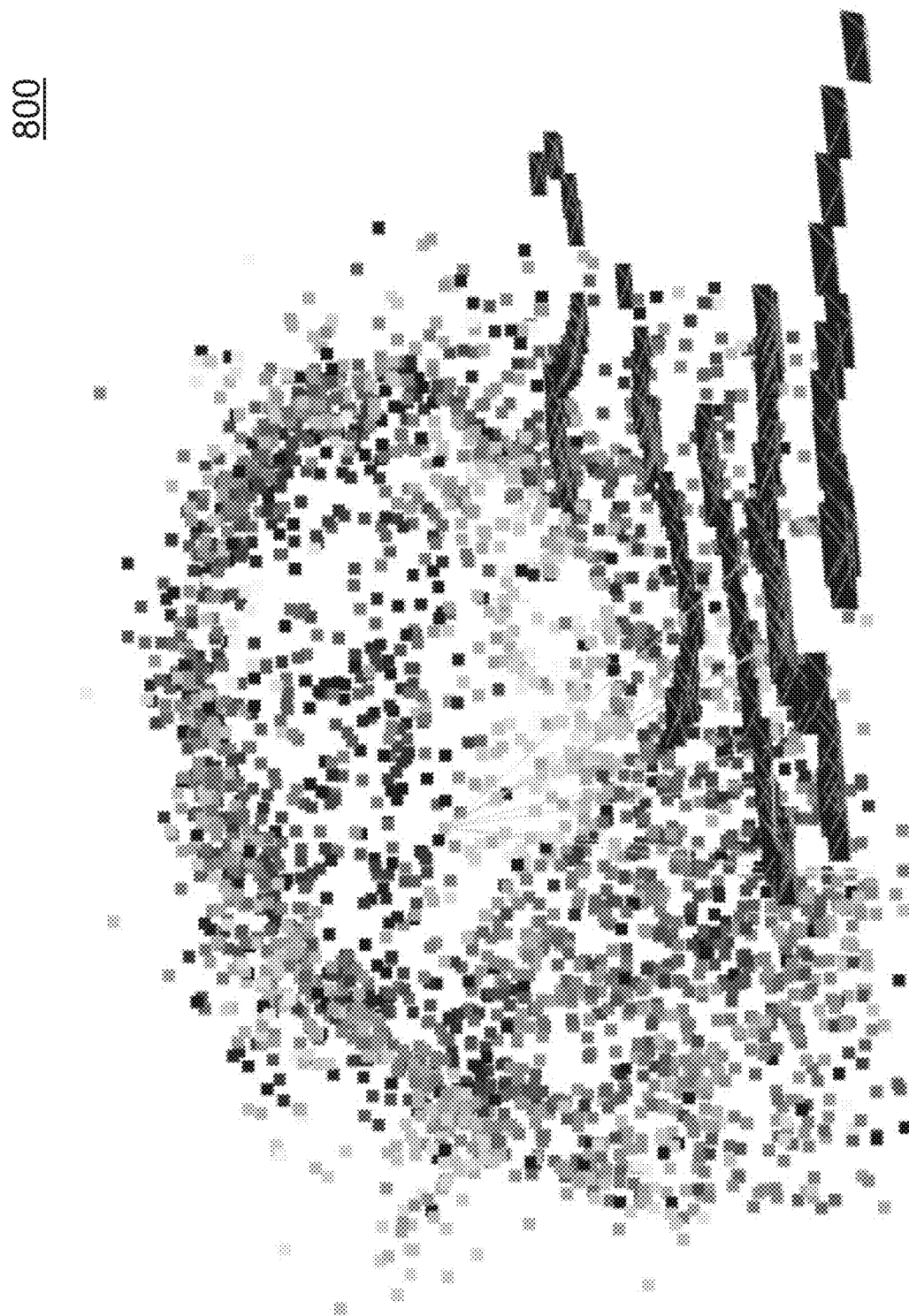
FIG. 8 is a diagram illustrating results of an Structure-from-Motion (SfM) reconstruction method involving endoscopic video.

FIG. 8 shows an example SfM reconstruction of endoscopic data using several segments from the overall video. In FIG. 8, individual 3D surface points (colored dots) and camera poses (dark lines) are jointly recovered.

SfS, first introduced in the 1970 thesis of Horn [27], is a monocular method of depth estimation that, given a single image viewing a scene, recreates the three-dimensional shape of the scene under given assumptions about the lighting conditions and surface reflectance properties [28], [29], [30]. A number of different formulations have been proposed to solve the SfS problem, including energy minimization, recovery of depth from estimated gradient, local shape estimation, and modeling as a partial differential equation (PDE) [28], [30]. Over the last decade, the PDE formulation of SfS has received the most attention, starting with Prados and Faugeras [31], who introduced a novel, provably convergent approach for solving the problem as a PDE.

One reason for using SfS is that many of its simplifying assumptions are well adjusted to general endoscopic devices. In particular, use of an endoscope allows us to assume a co-located camera and light source, which greatly simplifies the modeling of surface reflectance in the scene.

Reflectance Models. The amount of light reflecting from a surface can be modeled by a wavelength-dependent Bidirectional Reflectance Distribution Function (BRDF) that describes the ratio of the radiance of light reaching the observer $\lambda_{ir}$ to the irradiance of the light hitting the surface $E_{ir}$ [32]. Generally, a BRDF is given as a function of four variables: the angles $(\theta_i, \phi_i)$ between the incident light beam and the normal, and the reflected light angles $(\theta_r, \phi_r)$ with the normal; that is, $$BRDF_\lambda(\theta_i, \phi_i, \theta_r, \phi_r) = \frac{I_{\lambda r}}{E_{\lambda i}}, \quad (1)$$

where $\lambda$ represents light wavelength. In the following, the wavelength dependence of the BRDF may be implicitly assumed.

The irradiance for an incoming beam of light is itself a function of $\theta_i$ and the distance r to the light source:

$$E_i = I_i \frac{A}{r^2} \cos\theta_i, \quad (2)$$

where $I_i$ is the light source intensity and A relates to the projected area of the light source.

Two simplifying assumptions about the BRDF may be used that can help the overall modeling of the problem. First, surface isotropy of the BRDF may be assumed, which constrains it to only depend on the relative azimuth, $\Delta\phi = |\phi_i - \phi_r|$, rather than the angles themselves [33]. Second, the light source may be assumed to be approximately located at the camera center relative to the scene, which is a reasonable model for many endoscopic devices. In this case, the incident and reflected light angles are the same, i.e., $(\theta_i, \phi_i) = (\theta_r, \phi_r)$. Under these assumptions, the observed radiance simplifies to $$I_r(r, \theta_i) = I_i \frac{A}{r^2} \cos(\theta_i) BRDF(\theta_i). \quad (3)$$

The reflectance model described herein is based on the set of BRDF basis functions introduced by Koenderink et al. [33]. These functions form a complete, orthonormal basis on the half-sphere derived via a mapping from the Zernike polynomials, which are defined on the unit disk.

The BRDF basis of Koenderink et al. is adapted to produce a multi-lobe reflectance model for camera-centric SfS. First, taking the light source to be at the camera center, let $\theta_i = \theta_r$ and $\Delta\phi_{ir} = 0$; this gives $$BRDF(\theta_i) = \sum_{k=0}^{K-1} \left(\alpha_k + \beta_k \sin\left(\frac{\theta_i}{2}\right)\right) \cos^k \theta_i, \quad (4)$$

where $\alpha_k$ and $\beta_k$ are coefficients that specify the BRDF.

Surface Model. Let $(x,y) \in \Omega$ represent image coordinates after normalization by the intrinsic camera parameters (centering around the principal point and dividing by the focal length). For a given camera pose, the surface function $f: \Omega \to \mathbb{R}^3$ maps points in the image plane to 3D locations on a surface viewed by the camera. Under perspective projection, $$f(x, y) = z(x, y) \begin{pmatrix} x \\ y \\ 1 \end{pmatrix}, \quad (5)$$

where $z(x,y) > 0$ is a mapping from the image plane to depth along the camera's viewing axis. The distance r from the surface to the camera center is $$r(x,y) = \|f(x,y)\| = z(x,y)\sqrt{x^2 + y^2 + 1}, \quad (6)$$

and the normal to the surface is defined by the cross product between the x and y derivatives of $f$:

$$n(x, y) = f_x \times f_y = z \begin{pmatrix} -z_x \\ -z_y \\ xz_x + yz_y + z \end{pmatrix}. \quad (7)$$

Given a co-located light source, the light direction vector for a point in the image is the unit vector $$\hat{l}(x, y) = \frac{1}{\sqrt{x^2 + y^2 + 1}} (x, y, 1).$$

The cosine of the angle between the normal and light direction vectors is then equal to their dot product:

$$\cos\theta_i = \hat{n} \cdot \hat{l} = \frac{z}{\sqrt{(x^2 + y^2 + 1)(z_x^2 + z_y^2 + (xz_x + yz_y + z)^2)}}, \quad (8)$$

where ("carat") represents normalization to unit length.

Prados and Faugeras [31] note that Equation (8) can be simplified using the change of variables $v(x, y) = \ln z(x, y)$:

$$\hat{n} \cdot \hat{l} = \frac{1}{\sqrt{(x^2 + y^2 + 1)(v_x^2 + v_y^2 + (xv_x + yv_y + 1)^2)}}. \quad (9)$$

This transformation allows us to separate terms involving v from those involving its derivatives in the shading model described herein, which is useful for subsequent formulations described herein.

1) Adapted PDE framework: In the following, the traditional SfS PDE framework is modified to include regularization against a pre-existing estimated surface. Then, an implementation for solving this regularized SfS equation is addressed.

Original PDE. Equation (3) models observed intensity for a generic, isotropic BRDF with the assumption that the light source is co-located with the camera. Joining this with Equations (6) and (9) and multiplying by $r^2$, $$(x^2+y^2+1)I_re^{2v} - I_rA \cos(\theta_i)\mathrm{BRDF}(\theta_i) = 0 \quad (10)$$

(note $e^{2v} = z^2$). This is a static Hamilton-Jacobi equation of the form $$\begin{cases} Le^{2v} - H(v_x, v_y) = 0, & (x, y) \in \Omega \\ v(x, y) = \psi(x, y), & (x, y) \in \partial\Omega, \end{cases} \quad (11)$$

where the dependence of H and L on x and y is implied. $\psi(x, y)$ defines boundary conditions for the PDE.

Regularized Equation. The PDE introduced above is dependent on the accuracy of the BRDF modeling the scene. To prevent surface mis-estimations arising from an inaccurate BRDF, the 3D points obtained from SfM are used as an additional set of constraints for estimated log-depths v. A simple regularization is added to the SfS PDE (Equation (11)) that constrains the solution to be similar to a warped surface generated from the 3D SfM points. Instead of a proper PDE, consider the following energy function:

$$E(v) = \frac{1}{2}\left(e^{2v} - \frac{1}{L}H(v_x, v_y)\right)^2 + \frac{\lambda}{2}(e^{2v} - z_{warp}^2)^2, \quad (12)$$

where $Z_{warp}(x,y)$ is the depth of the warped surface at a given image coordinate, and the parameter $\lambda(x,y) \geq 0$ controls the influence of the right term, which regularizes on depths. $\lambda$ is defined in the iterative algorithm introduced below. Minimizing $E(v)$ w.r.t v, the following equation is obtained:

$$\frac{\partial E}{\partial v} = \left[e^{2v} - \frac{1}{1+\lambda}\left(\frac{1}{L}H(v_x, v_y) + \lambda z_{est}^2\right)\right]2e^{2v} = 0. \quad (13)$$

Incorporating boundary conditions, the following optimization problem is obtained:

$$\begin{cases} e^{2v} - \frac{1}{1+\lambda}\left(\frac{1}{L}H(v_x, v_y) + \lambda z_{est}^2\right) = 0 & (x, y) \in \Omega \\ v(x, y) = \psi(x, y), & (x, y) \in \partial\Omega. \end{cases} \quad (14)$$

Solving the Regularized SfS Equation. In some embodiments, the fast-sweeping method proposed for SfS by Ahmed and Farag [34], itself based on a method by Kao et al. [35], may be employed to approximately solve the regularized SfS equation described above. This approach uses the Lax-Friedrichs (LF) Hamiltonian, which provides an artificial viscosity approximation for solving static Hamiltonian-Jacobi equations. At a high level, the algorithm presented in [34] initializes the log-depth values $v(x, y)$ to a large positive constant and proceeds to iteratively update these values to progressively closer depths. The reference [34] discloses additional details related to a full algorithm of the fast-sweeping scheme, as the order of sweeping directions, treatment of boundary conditions, and convergence criterion presented in [34]. In some embodiments, a fast-sweeping approach utilized herein may be substantially the same as the algorithm of the fast-sweeping scheme described in [34]. In some embodiments, a fast-sweeping approach utilized herein may include alterations or differences from the algorithm of the fast-sweeping scheme described in [34]. For example, weighted finite differences may be used to mitigate the effect of smoothness assumptions in the implementation that cause inaccurate depth measurements along surface occlusion boundaries.

2) Iterative Update Scheme: An example iterative updating scheme is now described. The iterative updating scheme described herein may have similar aspects to an expectation-maximization (EM) algorithm in the sense that it iterates a step that involves optimizing a set of parameters (e.g., the reflectance model) based on the existing surface followed by a step computing expected depths using these parameters.

Algorithm 1 Shape-from-Motion-and-Shading

Input: An endoscopic image $F_i$ and its associated 3D SfM points.

Output: Final estimated surface $S(x,y)$.
1. Initialize surface $S^0(x,y)$.
2. For n from 0 until stopping criteria are met do
3. Warp $S^n(x,y)$ towards the 3D SfM points: $S_{warp}^n(x,y) = p(x,y)S^n(x,y)$.

4. Estimate reflectance parameters $\Theta_n$ using $S_{warp}{}^n(x, y)$ and the image.
5. Compute $S^{n+1}(x,y)$ using an Sfm-regularized SfS equation with parameters $\Theta_n$.

The proposed algorithm (Algorithm 1) takes as input an observed image and the 3D SfM points associated with that image. It outputs a dense surface using depth-correcting warpings, a surface reflectance model, and the regularized PDE framework.

Warping. The warped surface at iteration n of Algorithm 1 may be denoted as $S^n$. For initialization, an estimated surface $S^0$ is defined by the surface having $r(x, y)=1$, where r is defined in Equation (6). First, an image-space warp of $S^n$ may be performed using the 3D SfM points with known distance $\hat{r}_k(x_k, y_k)$ as control points. For each SfM point, the ratio $p_k=\hat{r}_k/r_k$ may be estimated where $r_k$ is the point's (bilinearly interpolated) distance on $S^n$. To minimize the effect of outlier points from SfM, a nearest-neighbor approach may be utilized to define the warping function: For each pixel (x,y) in the image, the N closest SfM points in the image plane may be computed. In some embodiments, N=10. Then, the warp function at that pixel may be defined as $\rho(x, y)=w_i \rho_i/\Sigma w_i$, where the sums are over the neighboring SfM points. In some embodiments, $w_i=\exp(-d_i)$, where $d_i$ is the distance in the image plane between (x,y) and a 2D representation of a SfM point $(x_k, y_k)$. The new surface may be calculated as $S^n(x, y)=\rho(x, y)S^n(x, y)$.

Figure 9:
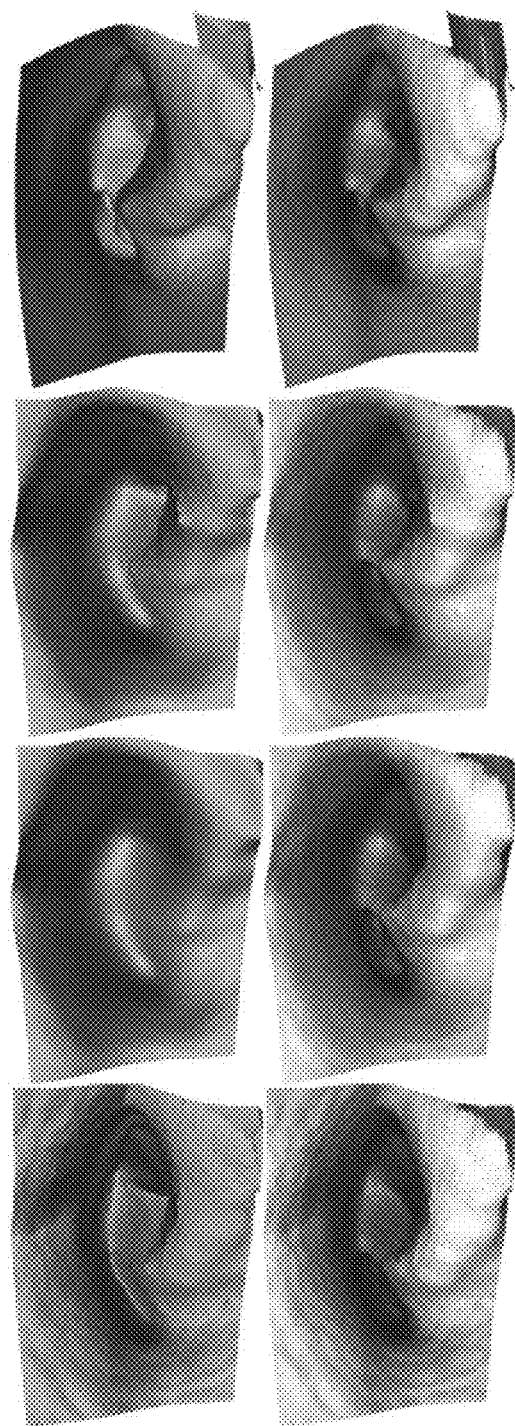
FIG. 9 shows a visual comparison of surfaces generated by a textured 3D reconstruction approach for an image from a ground truth dataset.

FIG. 9 shows a visual comparison of surfaces generated by an example textured 3D reconstruction approach described herein for an image from a ground truth dataset. In FIG. 9, the top row depicts visualizations of a surface without texture from an original image and the bottom row depicts visualizations of the surface with texture from the original image. Columns from left to right: (1) using a Lambertian BRDF, (2) using the proposed BRDF described herein (K=2) without image-weighted derivatives, (3) using the proposed BRDF described herein (K=2) with image-weighted derivatives, and (4) the ground-truth surface. Note the oversmoothing along occlusion boundaries in column (2) versus column (3).

Reflectance Model Estimation. From this warped surface, reflectance model parameters $\Theta$ may be optimized for the specified BRDF (where the parameters depend on the chosen BRDF). In some embodiments, this optimization may be performed by minimizing the least-squares error $$E(\Theta) = \sum_{\Omega} (I_r(x, y) - I_{est}(x, y; \Theta))^2, \qquad (15)$$

where $I^{est}(x,y;\Theta)$ is the estimated image intensity (see Equation (3)) as determined by $S_{warp}{}^n$ and the estimated BRDF.

SfS. Following reflectance model estimation, the PDE framework introduced above (Equation (14)) may be applied using the warped surface $S_{warp}{}^n$ for values of $z_{est}$ and using the current estimated reflectance model.

Concerning values of $\lambda(x, y)$ in the regularized PDE described herein, $\lambda>1$ may give greater weight to $S_{warp}{}^n$, while $\lambda<1$ may favor a purely SfS solution. The weighting may be decided based on agreement between the SfM points and $S_{warp}{}^n$. In some embodiments, $\Delta r_k$ be the distance between a 3D SfM point with distance $\hat{r}_k$ and its corresponding point on $S_{warp}{}^n$. The agreement between the warped surface and the SfM point may be defined as $\lambda_k=\log_{10} \hat{r}_k/2\Delta r_k$. This equally weights SfM and SfS (i.e., $\lambda_k=1$) when $\Delta r_k$ is 5% of $\hat{r}_k$. The log term serves to increase $\lambda_k$ by 1 for every order-of-magnitude decrease in $\Delta r_k/\hat{r}_k$. Just as for p(x, y) above, the same nearest-neighbor weighting scheme may be used to define $\lambda(x, y)$ based on the $\lambda_k$ values at the SfM control points.

Iteration. Once SfS has been performed, a newly estimated surface $S^{n+1}$ is generated. Then, the surface may be re-warped, the reflectance model may be re-estimated, and the regularized SfS may be re-run. This iterative process may be repeated for a maximum number of iterations or until convergence.

3) KLT and Optical Flow-based Correspondence Detection and Tracking: An example SfMS 3D reconstruction algorithm is described in the previous subsection. As described, SfM can be used to provide prior knowledge on depth that constrains surface geometry and reflectance model estimation. Therefore, a better SfM result can lead to more accurate dense surface reconstruction.

General-purpose SfM methods are designed for 3D reconstruction of unordered images. Thus, feature-based (SIFT or ORB features) localization methods are usually used. However, these methods are difficult to generalize to endoscopic videos because endoscopic images are extremely low-textured. Therefore, in order to produce more robust correspondence matching results, the temporal coherence constraints can be leveraged by using a KLT tracker. However, there are still cases that a simple KLT tracker cannot handle: temporal gaps. The aforementioned non-informative frame removal step in video preprocessing will sometimes result in temporal gaps. This can be understood as a short-term loop closure problem. This section presents a method that solves this problem and augments the tracking-based correspondence matching.

A common tracking algorithm is shown in Algorithm 2. The track function is a KLT tracker. Each keypoint is tracked from $F_i$ to $F_{i+1}$ using Lucas-Kanade optical flow. The resulting position is then tracked back from $F_{i+1}$ to $F_i$. If the point comes back to the original position in $F_i$, the tracking will be considered successful and the position in $F_{i+1}$ will be added into $P_{i+1}$.

Algorithm 2 Strictly Sequential Tracking

Input: $N_F$ sequential video frames, number of points $N_P$ to track.

Output: Set of keypoints $P_i$ for each frame, with correspondence from one frame to the next.

1. $\emptyset \to P_1$
2. For i from 1 to $N_F$ do
3. If $|P_i|<N_p$ then
4. Detect $N_p-|P_i|$ keypoints outside the neighborhoods of $P_i \to P_i^{new}$
5. $P_i \cup P_i^{new} \to P_i$
6. Track $(F_i, F_{i+1}, P_i) \to P_{i+1}$ In order to solve the short-term loop closure problem, Algorithm 2 may be improved by using a frame-skipping strategy. An example frame-skipping algorithm is shown in Algorithm 3. In Algorithm 3, one concept presented is to track not only the immediate next frame but also track the frames after it. Each frame maintains a set of unique 3D points that appears in the frame. In the meanwhile, a global hash table is also maintained to record for each unique 3D point the frames it has appeared in. The purpose of using unique 3D points is to save the computation if a keypoint's successor is already tracked from an even earlier frame.

Algorithm 3 Frame-Skipping Tracking

Input: $N_F$ sequential video frames, number of points $N_P$ to track, temporal window size $n \geq 0$.

Output: Set of keypoints $P_i$ for each frame, with correspondence from one frame to the next n frames.
1. For i from 1 to $N_F$ do
2. $\emptyset \rightarrow P_1$
3. For i from 1 to $N_F$ do
4. If $|P_i|<N_p$ then
5. Detect $N_p-|P_i|$ keypoints outside the neighborhoods of $P_i \rightarrow P_i^{new}$
6. Create a unique key for each keypoint in $P_i^{new}$
7. $P_i \cup P_i^{new} \rightarrow P_i$.
8. For j from j+1 to min (i+n, $N_F$) do
9. Find all points in $P_i$ whose unique keys are not in $P_j \rightarrow P_i^c$.
10. $P_i$ u track $(F_L, F_i, P_ic) \rightarrow P_1$. Each tracked keypoints inherits its origin's unique key.

C. Recurrent Neural Network (RNN) Based 3D Reconstruction

A temporally local frame-by-frame 3D reconstruction method named SfMS is discussed in a previous section that can estimate camera poses and dense depth maps for all key-frames. SfMS involves solving a large non-linear optimization and complex partial differential equations, so it can only be performed in an offline manner. However, in some applications, such as colonoscopy, a real-time 3D reconstruction may be useful because all the analysis may need to be done during the procedure. In addition, human tissue has rich texture and complex reflectance properties, which cannot be adequately modeled using the BRDF approach introduced in SfMS. Therefore, in some embodiments, an RNN based depth estimation method named DenseSLAMNet [38] may be utilized that implicitly models the complex tissue reflectance property and performs depth estimation and camera pose estimation in real-time.

Figure 10:
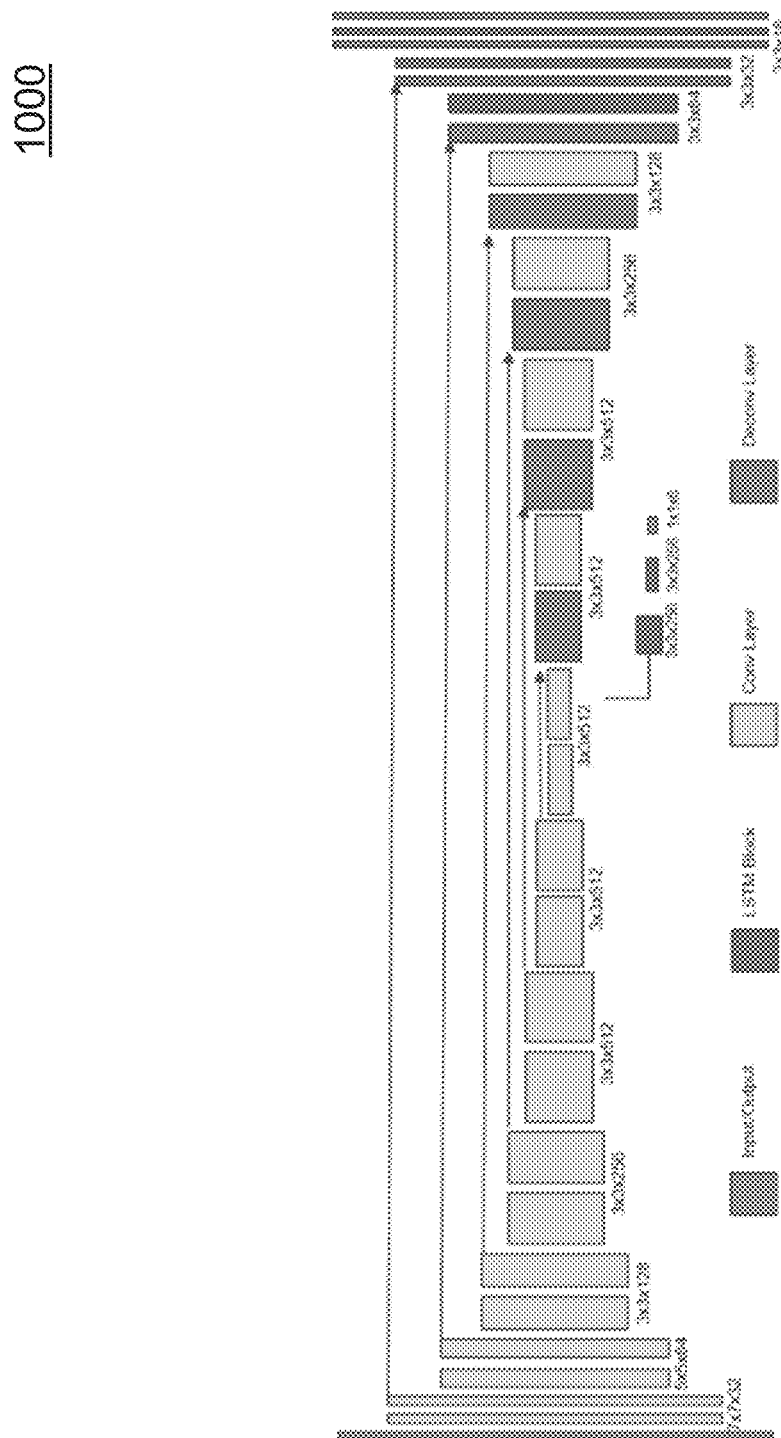
FIG. 10 shows the network architecture of DenseSLAM-Net at a single time step.

FIG. 10 shows the network architecture of DenseSLAM-Net at a single time step. In some embodiments, the DispNet architecture may be utilized in DenseSLAMNet. The width and height of each rectangular block indicates the size and the number of the feature map at that layer. Each increase and decrease of size represents a change factor of 2. The first convolutional layer has 32 feature maps. The kernel size for all convolution layers is 3, except for the first two convolution layers, which are 7 and 5, respectively. In the DenseSLAMNet, multiple views are incorporated into the single frame depth estimation through RNN. A temporal window of size t=10 may be used during training: every ten consecutive frames are grouped into one training sample and fed to the DenseSLAMNet sequentially. Once the network is trained, video frames can be fed to it sequentially and the DenseSLAMNet will output the dense depth map and relative camera pose for each input frame.

Figure 11:
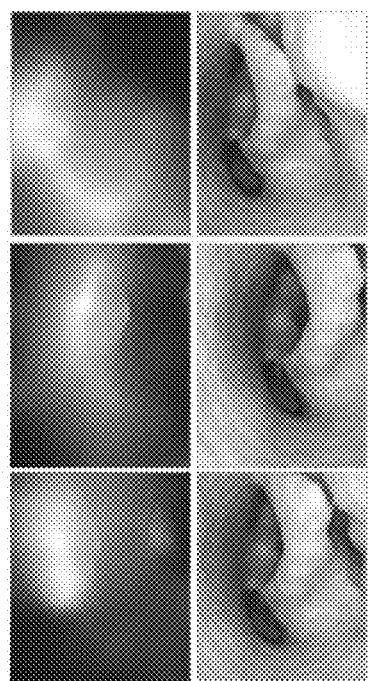
FIG. 11 shows an example of estimated dense depth maps of nasopharynoscopic images using the DenseSLAMNet.
Figure 11:
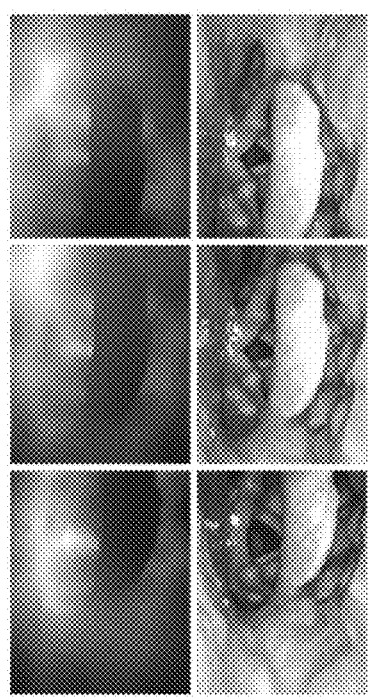

FIG. 11 shows an example of estimated dense depth maps of nasopharynoscopic images using the DenseSLAMNet. In FIG. 11, image group (a) includes a set of three images from one endoscopic video and their corresponding dense depth maps and image group (b) include a different set three images from another endoscopic video and their corresponding dense depth maps.

D. Deformable Surface Registration

Various factors (e.g., fast motion, occlusion, SfM failure, etc.) may result in multiple 3D reconstructions. To fuse multiple frame-by-frame 3D reconstructions from SfMS into an endoscopogram, a novel group-wise surface registration algorithm involving N-body interaction can be used. This algorithm is described in [3] and is based on Zhao et al. [36]'s pairwise surface registration algorithm, Thin Shell Demons. An overview of the novel group-wise surface registration algorithm is described below.

1) Thin Shell Demons: Thin Shell Demons is a physics motivated method that uses geometric virtual forces and a thin shell model to estimate surface deformation. The geometric virtual forces $\{f\}$ are defined as vectors connecting vertex pairs $\{u^k, v^k\}$ between two surfaces $\{S_1, S_2\}$ (k is used here to index correspondences). The correspondences are automatically computed using geometric and texture features. The thin shell model is a physical model which regularizes the non-parametric deformation vector field $\varphi$: $S_1 \rightarrow S_2$. Combining these two, the algorithm is defined as an iterative energy minimization function $$E(\phi) = \sum_{k=1}^{M} c(v^k)(\phi(v^k) - f(v^k))^2 + E_{shell}(\phi), \quad (16)$$

where $c(v^k)$ is the confidence score based on the feature distance and $E_{shell}$ is the thin shell deformation energy.

2) N-body Surface Registration: The endoscopogram may require registration of multiple partial surfaces. As an extension to the pairwise Thin Shell Demons, Zhao et al. [3] proposed a group-wise deformation scenario in which N surfaces are deformed under the influence of their mutual forces. Mutual forces are defined as virtual forces that attract one surface by all the other surfaces. In other words, the deformation of a single surface is determined by the overall forces exerted on it. Such group-wise attractions bypass the need of a target mean.

3) Orthotropic Thin Shell Elasticity Estimation: The thin shell model that was originally introduced by Zhao et al. assumes uniform isotropic elasticity, which contradicts human tissue elasticity being not only inhomogeneous but also anisotropic. Therefore, in order to better simulate the tissue deformation and produce more accurate registration results, Zhao recently [4] presented a statistical method that jointly estimates both the non-uniform anisotropic elasticity parameters and the material deformations from (within endoscopy deformations).

Figure 12:
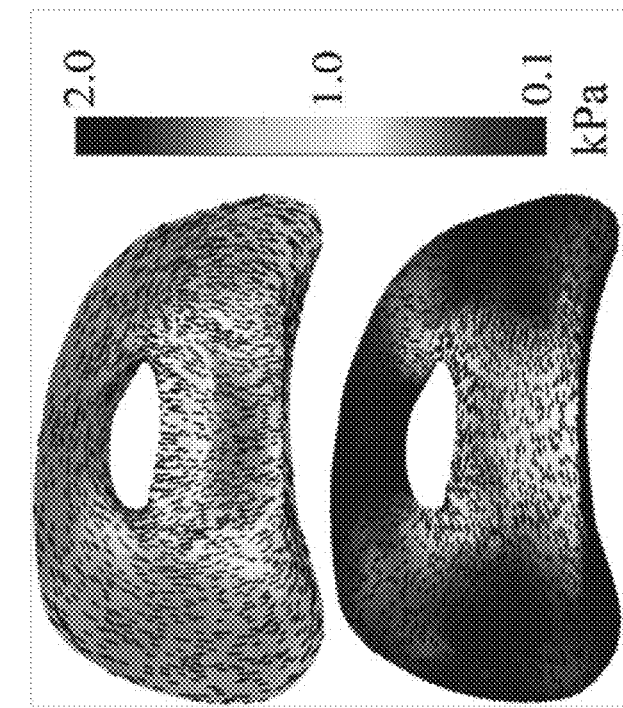
FIG. 12 shows an example of orthotropic elasticity estimation at each vertex on surface.
Figure 12:
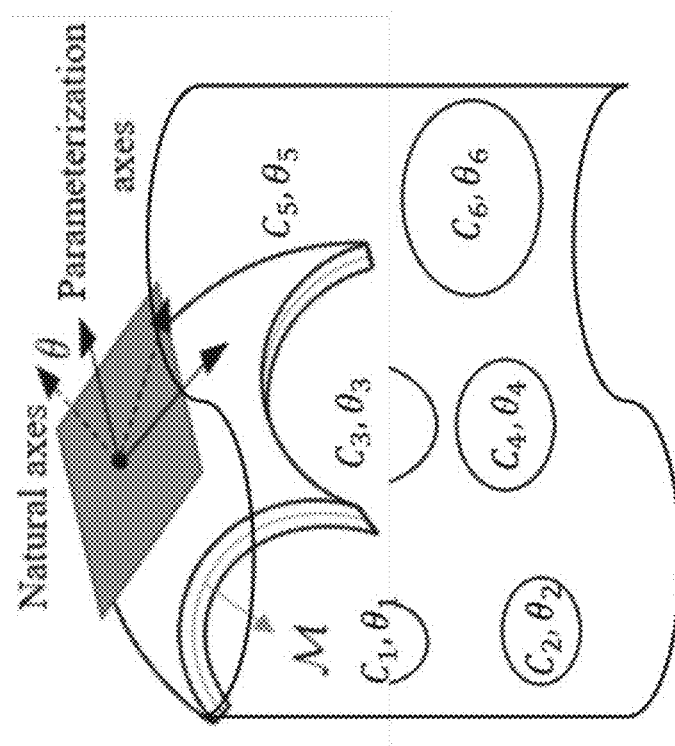

FIG. 12 shows an example of orthotropic elasticity estimation at each vertex on surface. As shown in FIG. 12, at each vertex on the surface model a canonical orthotropic model is formed by estimating the direction of its natural axes and the elasticity parameters along each axis. The estimated inhomogeneous and anisotropic elasticity parameters are shown to improve the surface registration accuracy and can help in studying within-patient deformations.

E. Fusion-Guided SfMS

In the SfMS reconstruction method introduced in section IV-A, there are no temporal constraints between successive frame-by-frame reconstructions. This fact and the method's reliance on reflectance model initialization can lead to inconsistent reconstructions and may even result in failure to reconstruct some frames. As such, manual intervention may be needed for selecting partial surface reconstructions for fusion.

Wang et al. [37] introduced a method named fusion-guided SfMS that solves the inconsistency problem in the SfMS method so that longer sequences can be fused together without any manual intervention. One main idea of the fusion-guided SfMS method is to produce a single "reference model" which can be consistently used as a guide across all frame-by-frame reconstructions so that temporal constraints are imposed among them. Such a reference model, $S_{fused}$, is used in fusion-guided SfMS.

The multiple frame-based surfaces warped to fit the SfM points, $\{S_{warp}^{i,j}|j=1, \ldots, n\}$ (see section IV-D), are fused to form $S_{fused}$. This may be done using group-wise TSD. Then for each frame, a depth map that corresponds to its camera position is extracted from $S_{fused}$ for reflectance model estimation. In such a way, all the single frame reconstructions may be using the same reference surface as used for reflectance model estimation, so more coherent results are generated.

Figure 13:
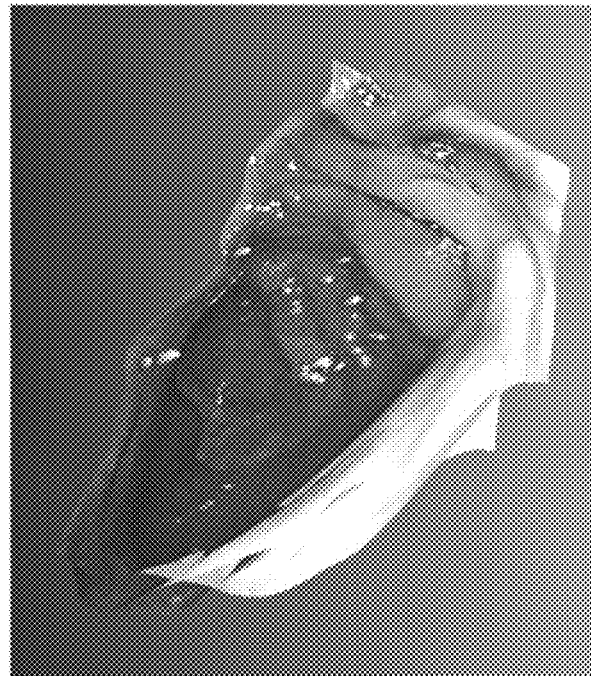
FIG. 13 is a diagram illustrating example results of a fusion-guided SfMS approach.
Figure 13:
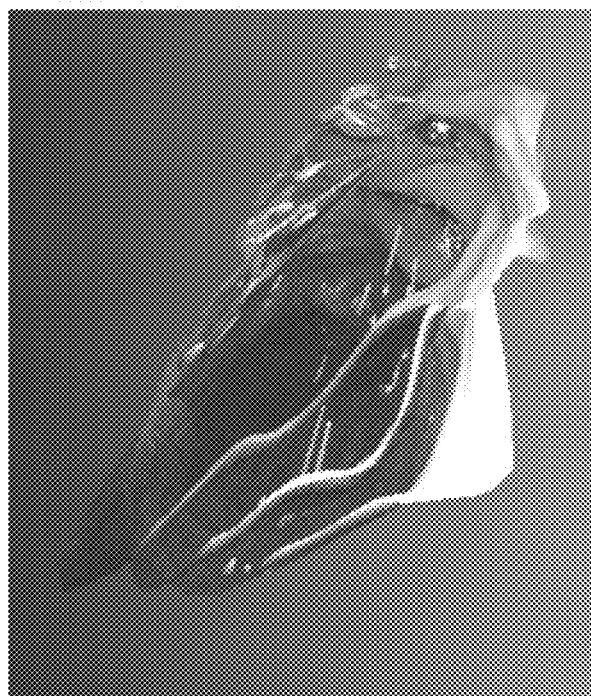

FIG. 13 is a diagram illustrating example results of a fusion-guided SfMS approach. FIG. 13 shows an example of the inconsistency problem being solved by the fusion-guided SfMS method. This fits naturally to the iterative process of SfMS algorithm that described in Algorithm 1. At each iteration i, a new fused reference surface $S_{fused}^i$ generated by fusing $\{S_{warp}^{i,j}|j=1, \ldots, n\}$ together.

F. Seamless Texture Fusion

An endoscopogram may be generated by fusing both the geometry and texture from the multiple partial reconstructions. A method for fusion of the texture maps acquired from different views is described herein. Dramatically changing illumination (light binding with camera), reflection and surface deformation in endoscopic video make this problem nontrivial. The illumination changes in endoscopic images are huge even for subtle camera motions. Therefore, a texture map may be needed that is derived from the various frames but avoids the dramatic color differences caused by the challenges mentioned above.

Figure 14:
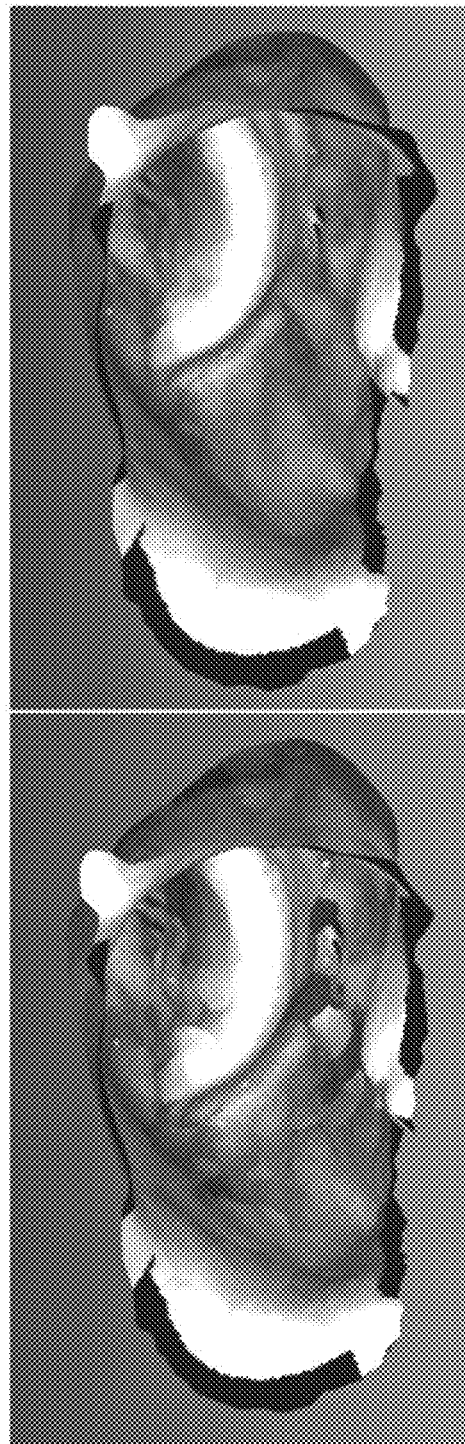
FIG. 14 is a diagram illustrating example results of a seamless texture fusion approach.

An example seamless texture fusion approach described herein has two stages. In the first stage, an initial texture is created: for each voxel on the endoscopogram surface, the image is selected whose reconstruction has the closest distance to that voxel to color it. A Markov Random Field (MRF) based regularization is used to make the pixel selection more spatially consistent, resulting in a texture map that has multiple patches with clear seams, as shown in FIG. 14. Then in the second stage, to generate a seamless texture, within-patch intensity gradient magnitude differences and inter-patch-boundary color differences are minimized.

FIG. 14 is a diagram illustrating example results of a seamless texture fusion approach. In FIG. 14k, the left image is before texture fusion (e.g., an initial pixel selection result) and the right image is after texture fusion (e.g., a seamless texture fusion result).

Initial pixel selection and seam placement: In the fusion process used to form an endoscopogram, each frame has been registered onto the endoscopogram. At each endoscopogram vertex S(i) one of these registered frame-based surfaces $S'_k$ is closest. To begin the initialization, the color from this frame is transferred to form the initial texture map for the endoscopogram. However, the irregularity of such selection can result in extreme patchiness. Thus, a regularity energy term can be added that depends on the labels in the local neighborhood. Then for each pixel on the endoscopogram the scheme selects the frame index k providing the color as follows:

$$D_k(i) = \min_{j \in S'_k} d(S(i), S'_k(j))$$

$$M(k) = \operatorname*{argmin}_{k \in L} \sum_{i \in S} (D_k(i) + \lambda N_{k,i})$$

where $D_k(i)$ is the minimum distance from the surface $S'_k$ to the $i^{th}$ point on the surface S, where $N_{k,i}$ is the number of voxels in the neighboring voxel S(i) that have different labels from the label k, where $k \in 1 \ldots N$ indicates the frame indices, and where M is the initial fused texture map. Such a setup is often called a Markov Random Field.

Texture fusion by minimizing within-patch and interpatch differences: In this subsection, details are provided indicating how the texture map M resulting from step 1 may be modified through an iterative optimization to produce a seamless texture.

Let F be the set of images used to create the fused texture map. Let $I_k$ be a single image in F. Let $\omega_k$ be all the pixels in image k that are selected to color M. A list φ may be created that is composed of pairs of adjacent pixels in M that come from a different lighting condition, i.e., are members of different sets $\omega_k$.

The fused texture should have a low within-patch intensity gradient magnitude difference. The intuition is that the fused image should have the same details as the original images. The fused texture should also have low inter-patch-boundary color differences. Thus, consider the equation below:

$$L_A = f + \lambda g + \mu \|g\|^2 \qquad (17)$$

where f sums the within-$\omega_k$ intensity gradient magnitudes squared and g sums the color difference magnitudes squared of pixel pairs in φ. That is, $$f = \sum_{k \in F} \sum_{i \in \omega_k} \|\nabla M(C(I_k(i))) - \nabla I_k(i)\|_2^2 \qquad (18)$$

where $I_k(i)$ is the $i^{th}$ pixel in frame k that used to form texture map M. $C(I_k(i))$ is the coordinate in M corresponding to pixel $I_k(i)$; and $$g = \sum_{(i,j) \in \phi} \|M(i) - M(j)\|_2^2 \qquad (19)$$

An augmented Lagrangian method can be used to solve the optimization problem in Equation 17 iteratively.

G. The Endoscopogram-to-CT Registration

After a complete endoscopogram is generated using 3D reconstruction and group-wise geometry fusion algorithms described herein, the endoscopogram may be registered to CT for achieving the fusion between endoscopic video and CT. To allow a good initialization of the registration, first the tissue-gas surface from the CT may be identified or derived (e.g., extracted) and then a surface-to-surface registration between the endoscopogram and the surface derived from the CT may be performed.

As discussed in section II, the registration between the endoscopogram and the CT extracted surface have the following challenges: (1) the surface extracted from endoscopy suffers from serious missing patches due to some anatomy being not visible in the camera view; (2) the partial volume effect in CT leads to large topology differences between CT and endoscopogram; and (3) a large anatomic deformation between CT and endoscopy results from patient posture differences and the introduction of the endoscope.

Our solutions to the above challenges are (1) using the thin shell demons registration algorithm, which is presented in detail in section IV-B, that is robust to missing surface and large topology changes; (2) applying the anisotropic elasticity parameters estimated in the group-wise registration to the endoscopogram to CT registration, which is presented in section IV-C; (3) using an expectation-maximization algorithm to estimate incompatible regions. A possible embodiment of the incompatible regions estimation is discussed below.

Because there are missing patches and topology differences between CT and endoscopogram surfaces that cause some points on either surface not to correspond to any point on the other surface, these patches may be explicitly determined, lest they be wrongly matched to the regions with highest matching scores since such wrong matching can cause wrong attraction forces being generated during the registration.

Disparity Estimation. In order to solve this problem, a binary indicator function may be used that indicates whether a point has a corresponding point or not. The indicator function and the deformation variable maybe jointly estimated iteratively using an EM algorithm. Let $\Xi_1$ and $\iota_2$ be the indicator functions for surfaces $S_1$ and $S_2$ respectively. The function value (0 or 1) indicates whether a vertex has a correspondence in the other surface; that is, $\Xi_1(x)=0$ means $S_1(x)$ does not have a correspondence in $S_2$. The E-step in disparity estimation computes the conditional distribution on $\Xi_1$, $\Xi_2$ given the current estimate of the deformations $\varphi_1$, $\varphi_2$:

$$p(\Xi_i|S_i,\varphi_i^j)=p(S_i|\varphi_i^j,\Xi_i)p(\Xi_i) \qquad (20)$$

The likelihood term $p(S_i|\varphi_i^j,\Xi_i)$ models how good the deformations align the compatible regions between the two surfaces. Mathematically, given the two deformed surfaces $S'_1=S'_1\circ\varphi_1$, $S'_2=S_2\circ\varphi_2$ and their closest points on the other surfaces $C_1(x)$, $C_2(X)$, $$p(S_i \mid \phi_i^j, \Xi_i) = \frac{1}{Z_0}\exp(-\gamma L(S_i, \phi_i, \Xi_i)) \qquad (21)$$

$$L(S_i, \phi_i, \Xi_i)) = \sum_{x\in S_1} (\Xi_1(x)\cdot \|S'_1(x) - C_1(x)\|^2) \qquad (22)$$
$$= +\sum_{x\in S_2} (\Xi_2(x)\cdot \|S'_2(x) - C_2(x)\|^2)$$

where the squared distance $\|S'_1(x)-C_1(x)\|^2$ measures the quality of the alignment. The M-step in this indicator function and deformation variable estimation algorithm is simply a TSD registration with attraction forces applied on compatible regions specified by the indicator functions. The algorithm initializes the two indicator functions with all ones and then iterates between the M-step and E-step until convergence.

Figure 15:
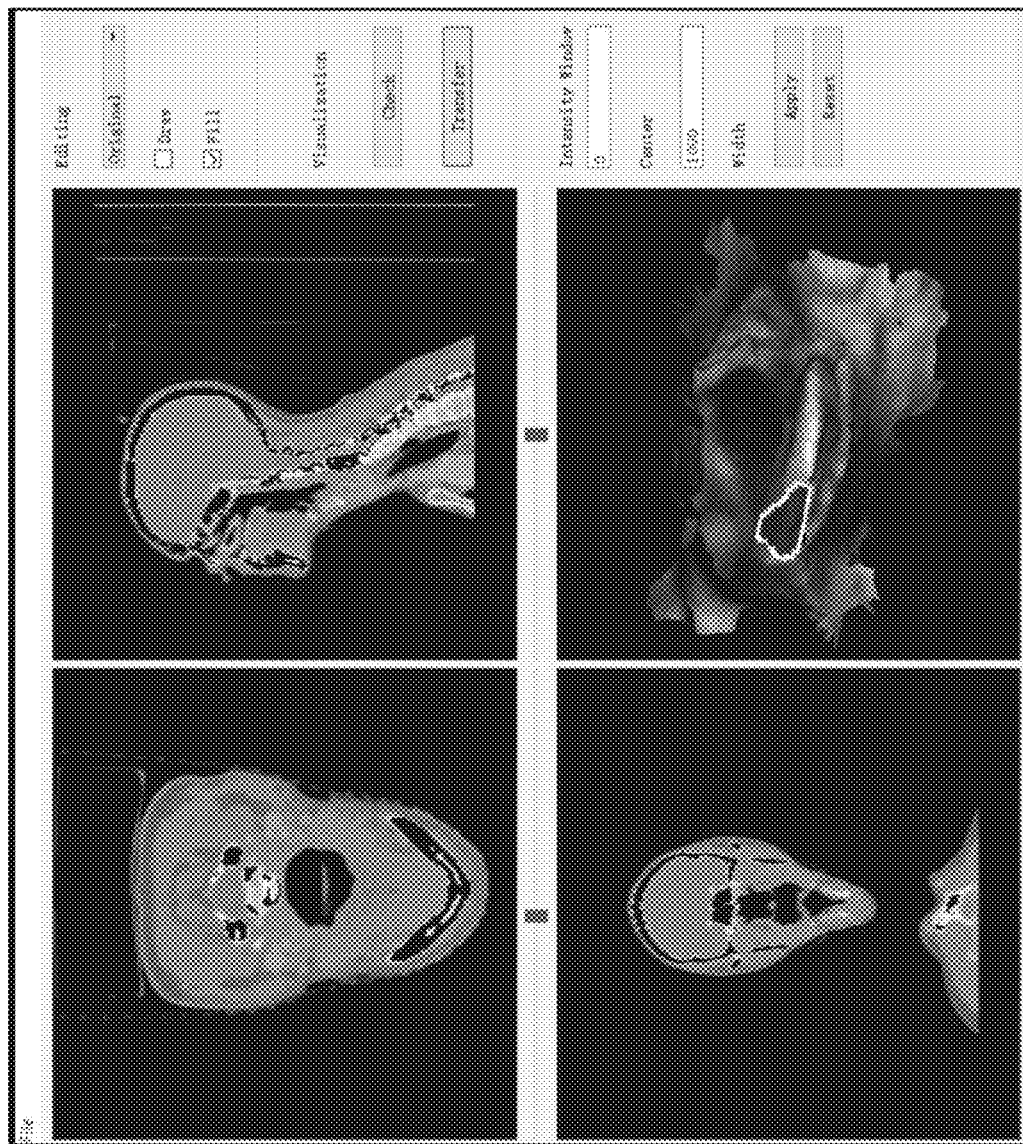
FIG. 15 is a diagram illustrating an example region of interest (ROI) marked on an endoscopogram surface and transferred to a CT image.

FIG. 15 is a diagram illustrating an example region of interest (ROI) marked on an endoscopogram surface and transferred to a CT image. In some embodiments, the user drawn ROI may be shown as a red region surrounded by a white contour in the lower right window. For example, the ROI may be a suspected tumor or other area of interest. In some embodiments, by having an endoscopogram surface being registered to the CT extracted surface, a graphical user interface (GUI) based tool may be used for the physicians to directly draw on the endoscopogram surface. The highlighted region extended to some depth can then be displayed in the same space as the CT image as well as each individual endoscopic video frame.

Reference will now be made in detail to various embodiments of the subject matter described herein, examples of which may be illustrated in the accompanying drawings. Wherever possible, the same reference numbers will be used throughout the drawings to refer to the same or like parts.

Figure 16:
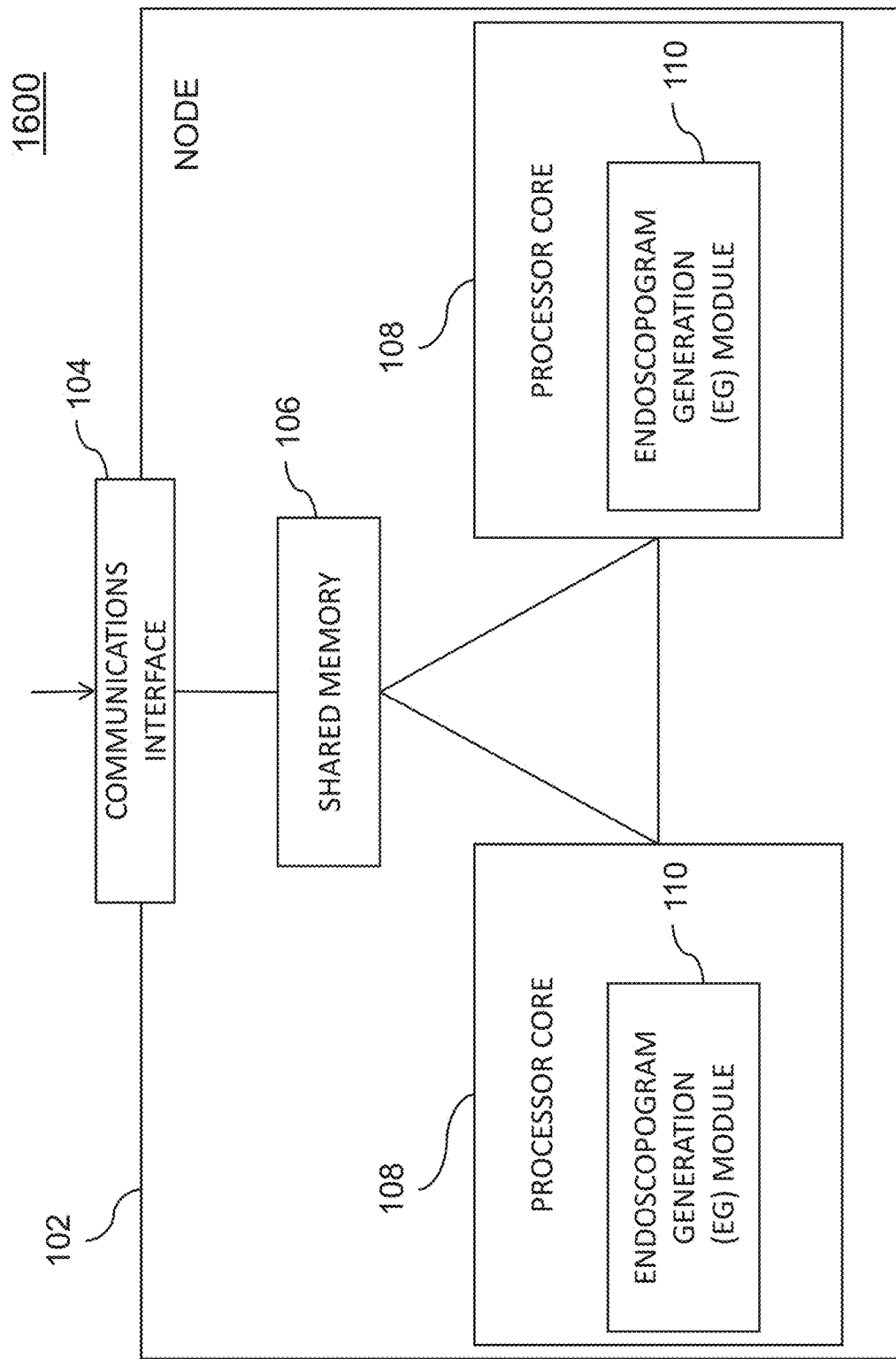
FIG. 16 is a diagram illustrating an example node for deriving a 3D textured surface from endoscopic video.

FIG. 16 is a diagram illustrating an example node 102 (e.g., one or more single or multiple processing core computing devices) for deriving a 3D textured surface from endoscopic video. Node 102 may be any suitable entity, such as one or more computing devices or platforms, for performing one more aspects of the present subject matter described herein. In some embodiments, components, modules, and/or portions of node 102 may be implemented or distributed across multiple devices or computing platforms.

Node 102 may include a communications interface 104, a shared memory 106, and one or more processor cores 108. Communications interface 104 may be any suitable entity (e.g., a communications interface, a network interface card, and/or a data acquisition and generation (DAG) card) for receiving and/or sending messages. For example, communications interface 104 may be interface between various nodes 102 in a computing cluster. In another example, communications interface 104 may be associated with a user interface or other entity and may receive configuration settings and/or source data, such as endoscopic video, for deriving a 3D textured surface (e.g., an endoscopogram) from endoscopic video and/or for performing registration of the endoscopogram to one or more CT images.

In some embodiments, communications interface 104 or another component may be configured to identify or select a processor core 108 for processing, analysis, and/or storage. For example, communications interface 104 may receive information from another node in a cluster and may determine that a particular processor core 108 should process the received information. In another example, communications interface 104 may store information in shared memory 106 and the stored information may be retrieved later by an available processor core 108.

Shared memory 106 may be any suitable entity (e.g., random access memory or flash memory) for storing 3D textured surface modeling information, registration algorithms, surface reconstruction algorithms, specularity removal algorithms, texture fusion algorithms, endoscopic videos, and/or other information. Various components, such as communications interface 104 and software executing on processor cores 108, may access (e.g., read from and/or write to) shared memory 106.

Each of processor cores 108 represents any suitable entity (e.g., a physical processor, a field-programmable gateway array (FPGA), and/or an application-specific integrated circuit (ASIC)) for performing one or more functions associated with 3D textured surface reconstruction, surface-to-surface registration (e.g., endoscopogram to CT registration), frame preprocessing, frame selection, seamless texture fusion, and/or related methods, algorithms, and/or techniques. Processor cores 108 may be associated with an endoscopogram generation (EG) module 110. For example, EG module 110 or software therein may be executable by one or more processor cores 108.

EG module 110 may be configured to use one or more methods, algorithms, and/or techniques for deriving or reconstructing a 3D textured surface and/or for surface-to-surface registration (e.g., endoscopogram to CT registration). For example, EG module 110 may utilize one or more deep learning techniques and/or related networks (e.g., RNNs) to generate a textured surface from a plurality of video frames of an endoscopic video and/or to register the 3D textured surface to at least one CT image.

It will be appreciated that FIG. 16 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 17:
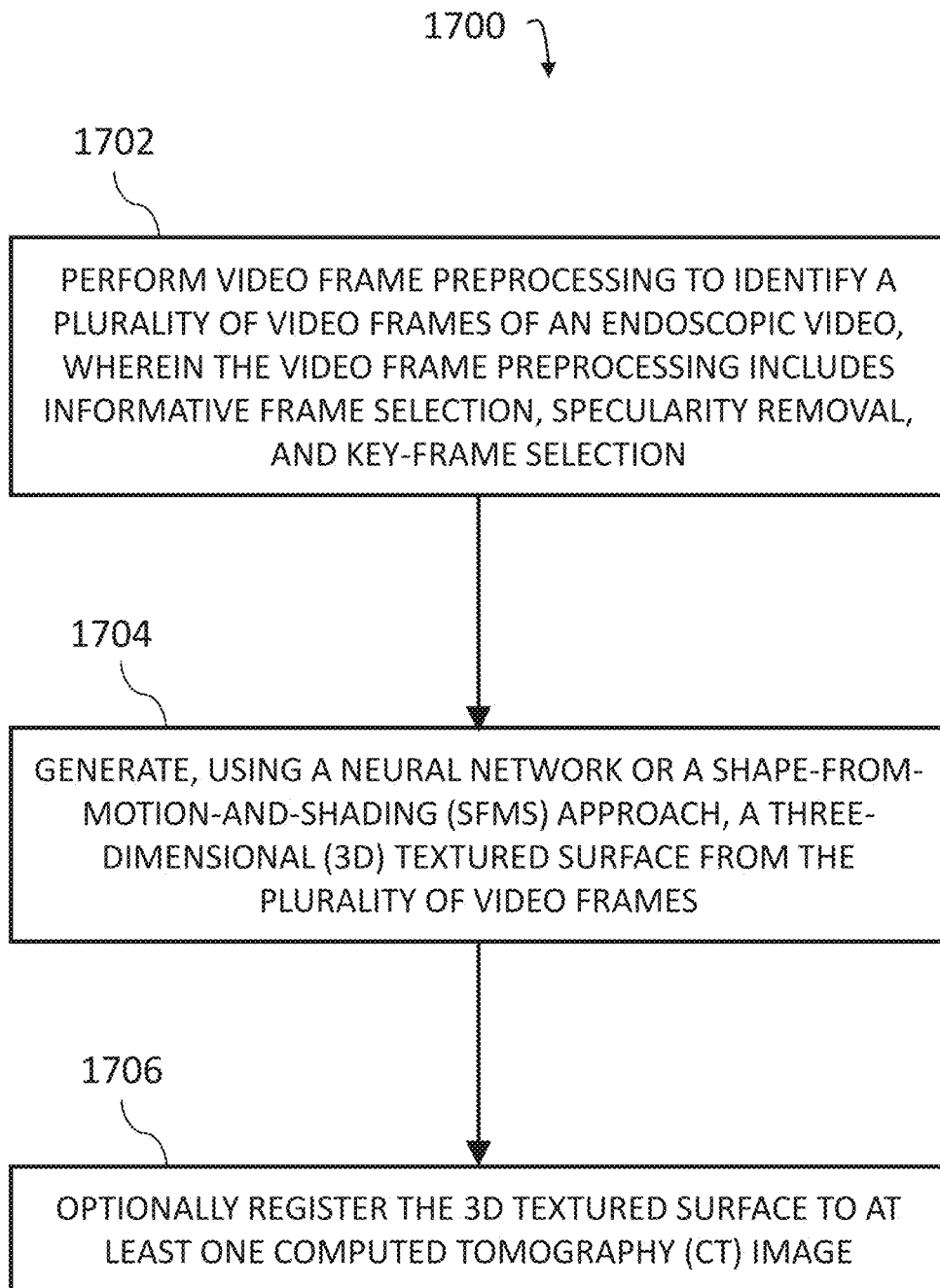
FIG. 17 is a diagram illustrating an example process for deriving a 3D textured surface from endoscopic video.

FIG. 17 is a diagram illustrating an example process 1700 for deriving a 3D textured surface from endoscopic video. In some embodiments, example process 1700, or portions thereof, may be performed by or at EG 110, processor core(s) 108, node 102, and/or another node or module.

In step 1702, video frame preprocessing may be performed to identify a plurality of video frames of an endoscopic video, wherein the video frame preprocessing includes informative frame selection, specularity removal, and key-frame selection.

In step 1704, a 3D textured surface may be generated, using a neural network or a SfMS approach, from the plurality of video frames.

In step 1706, the 3D textured surface may be optionally registered to at least one CT image.

In some embodiments, example process 1700 may include marking, via a user interface, an ROI of the 3D textured surface, wherein after registering the 3D textured surface, the ROI is visible on the at least one CT image.

In some embodiments, generating the 3D textured surface may comprise: generating a partial 3D surface for each of the plurality of video frames using the SfMS approach; and fusing, using a group-wise surface registration algorithm and a seamless texture fusion approach, the partial surfaces into the 3D textured surface.

In some embodiments, the SfMS approach may comprise: estimating camera motion and 3D scene structure associated with an input image using a SfM approach or a depth estimation model, wherein the scene structure is parameterized by a SfM point cloud; and generating, using an iterative update scheme, a new estimated 3D surface for the input image after each iteration, wherein the iterative update scheme stops when convergence is reached or another condition is met.

In some embodiments, the depth estimation model may utilize an RNN.

In some embodiments, the iterative update scheme may comprise, during an iteration: warping an estimated surface to the SfM point cloud associated with the input image; estimating a reflectance model using this warped surface and the input image; and producing, using the estimated surface and the reflectance model, a new estimated surface using a regularized SfS equation, wherein a subsequent (e.g., the next) iteration uses the new estimated surface when warping.

In some embodiments, the seamless texture fusion approach may comprise: generating an initial texture for the 3D textured surface by, for each voxel on the 3D textured surface, selecting an image whose partial 3D surface has the closest distance to that voxel to color it; and performing texture fusion by minimizing within-patch and inter-patch differences using an augmented Lagrangian method.

In some embodiments, registering the 3D textured surface to the at least one CT image may comprise: identifying a tissue-gas surface based on the at least one CT image; and performing a surface-to-surface registration between the 3D textured surface and the tissue-gas surface.

In some embodiments, performing the surface-to-surface registration may comprise: using a thin shell demons (TSD) registration algorithm and applying anisotropic elasticity parameters estimated in a group-wise surface registration to deform the 3D textured surface; and using an expectation-maximization algorithm to align compatible surface regions between the deformed 3D textured surface and the tissue-gas surface It should be noted that EG 110, processor core(s) 108, node 102, and/or functionality described herein may constitute a special-purpose computing device. Further, EG 110, processor core(s) 108, node 102, and/or functionality described herein can improve the technological field of medical image analysis, medical diagnosis, and/or related treatment planning. For example, the functionality described herein can significantly aid in tumor localization by marking a ROI on the 3D textured surface which can then be automatically registered to CT slices. Such tumor localization can be very beneficial for cancer treatment and/or surgery. Further, by using various aspects described herein, the 3D textured surface can be derived online (e.g., in real-time or near real-time), thereby increasing efficacy in treatment and surgical applications.

REFERENCES

The disclosures of all of the references listed herein are hereby incorporated herein by reference in their entireties.

[1] R. J. Schwab et al., "Dynamic imaging of the upper airway during respiration in normal subjects," Journal of Applied Physiology, vol. 74, no. 4, pp. 1504-1514, 1993.

[2] S. M. Kim et al., "Pharyngeal pressure analysis by the finite element method during liquid bolus swallow," Annals of Otology, Rhinology & Laryngology, vol. 109, no. 6, pp. 585-589, 2000.

[3] Q. Zhao et al., "The endoscopogram: A 3d model reconstructed from endoscopic video frames," in International Conference on Medical Image Computing and Computer-Assisted Intervention. Springer, 2016, pp. 439-447.

[4] Q. Zhao et al., "Orthotropic thin shell elasticity estimation for surface registration," in International Conference on Information Processing in Medical Imaging. Springer, 2017, pp. 493-504.

[5] M. Salzmann and P. Fua, "Deformable surface 3d reconstruction from monocular images," Synthesis Lectures on Computer Vision, vol. 2, no. 1, pp. 1-113, 2010.

[6] C. Wu et al., "Shading-based dynamic shape refinement from multi-view video under general illumination," in International Conference on Computer Vision (ICCV), 2011.

[7] Y. Han et al., "High quality shape from a single rgb-d image under uncalibrated natural illumination," in International Conference on Computer Vision (ICCV), 2013.

[8] M. Zollhöfer et al., "Shading-based refinement on volumetric signed distance functions," ACM Transactions on Graphics (TOG), vol. 34, no. 4, 2015.

[9] H. N. Tokgozoglu et al., "Color-based hybrid reconstruction for endoscopy," in Computer Vision and Pattern Recognition Workshops (CVPRW), 2012.

[10] A. Bartoli et al., "Shape-from-template," Pattern Analysis and Machine Intelligence (PAMI), vol. 37, no. 10, pp. 2099-2118, 2015.

[11] A. Malti et al., "Template-based conformal shape-from-motion from registered laparoscopic images," in Conference on Medical Image Understanding and Analysis (MIUA), 2011.

[12] A. Malti et al., "Template-based conformal shape-from-motion-and-shading for laparoscopy," in Information Processing in Computer-Assisted Interventions (IPCAI), 2012.

[13] A. Malti and A. Bartoli, "Combining conformal deformation and cook-torrance shading for 3-d reconstruction in laparoscopy," Biomedical Engineering, IEEE Transactions on, vol. 61, no. 6, pp. 1684-1692, 2014.

[14] A. Elad and R. Kimmel, "On bending invariant signatures for surfaces," IEEE Transactions on pattern analysis and machine intelligence, vol. 25, no. 10, pp. 1285-1295, 2003.

[15] A. M. Bronstein et al., "Generalized multidimensional scaling: a framework for isometry-invariant partial surface matching," Proceedings of the National Academy of Sciences, vol. 103, no. 5, pp. 1168-1172, 2006.

[16] X. Gu et al., "Genus zero surface conformal mapping and its application to brain surface mapping," IEEE Transactions on Medical Imaging, vol. 23, no. 8, pp. 949-958, 2004.

[17] J. Sun et al., "A concise and provably informative multi-scale signature based on heat diffusion," in Computer graphics forum, vol. 28, no. 5. Wiley Online Library, 2009, pp. 1383-1392.

[18] T. Gatzke et al., "Curvature maps for local shape comparison," in Shape Modeling and Applications, 2005 International Conference. IEEE, 2005, pp. 244-253.

[19] A. Zaharescu et al., "Surface feature detection and description with applications to mesh matching," in Computer Vision and Pattern Recognition, 2009. CVPR 2009. IEEE Conference on. IEEE, 2009, pp. 373-380.

[20] Y. Zeng et al., "A generic deformation model for dense non-rigid surface registration: A higher-order mrf-based approach," in Computer Vision (ICCV), 2013 IEEE International Conference on. IEEE, 2013, pp. 3360-3367.

[21] M. Bauer and M. Bruveris, "A new riemannian setting for surface registration," arXiv preprint arXiv:1106.0620, 2011. 3.

[22] J.-P. Thirion, "Image matching as a diffusion process: an analogy with maxwell's demons," Medical image analysis, vol. 2, no. 3, pp. 243-260, 1998.

[23] K. Simonyan and A. Zisserman, "Very deep convolutional networks for large-scale image recognition," arXiv preprint arXiv:1409.1556, 2014.

[24] N. Mayer et al., "A large dataset to train convolutional networks for disparity, optical flow, and scene flow estimation," in Proceedings of the IEEE Conference on Computer Vision and Pattern Recognition, 2016, pp. 4040-4048.

[25] E. Ilg et al., "Flownet 2.0: Evolution of optical flow estimation with deep networks," in IEEE Conference on Computer Vision and Pattern Recognition (CVPR), vol. 2, 2017.

[26] L. Maier-Hein et al., "Optical techniques for 3d surface reconstruction in computer-assisted laparoscopic surgery," Medical image analysis, vol. 17, no. 8, pp. 974-996, 2013.

[27] B. K. Horn, "Shape from shading: A method for obtaining the shape of a smooth opaque object from one view," Dissertation, Massachusetts Institute of Technology, 1970.

[28] R. Zhang et al., "Shape-from-shading: a survey," Pattern Analysis and Machine Intelligence, vol. 21, no. 8, pp. 690-706, 1999.

[29] E. Prados and O. Faugeras, "Shape from shading," in Handbook of mathematical models in computer vision, N. Paragios et al., Eds. Springer, 2006, pp. 375-388.

[30] J.-D. Durou et al., "Numerical methods for shape-from-shading: A new survey with benchmarks," Computer Vision and Image Understanding, vol. 109, no. 1, pp. 22-43, 2008.

[31] E. Prados and O. Faugeras, "Shape from shading: a well-posed problem?" in Computer Vision and Pattern Recognition (CVPR), 2005.

[32] R. L. Cook and K. E. Torrance, "A reflectance model for computer graphics," ACM Transactions on Graphics, vol. 1, no. 1, pp. 7-24, 1982.

[33] J. J. Koenderink et al., "Bidirectional reflection distribution function expressed in terms of surface scattering modes," in European Conference on Computer Vision (ECCV), 1996.

[34] A. H. Ahmed and A. A. Farag, "A new formulation for shape from shading for non-lambertian surfaces," in Computer Vision and Pattern Recognition (CVPR), 2006.

[35] C. Y. Kao et al., "Lax-friedrichs sweeping scheme for static hamilton-jacobi equations," Journal of Computational Physics, vol. 196, no. 1, pp. 367-391, 2004.

[36] Q. Zhao et al., "Surface registration in the presence of missing patches and topology change." in MIUA, 2015, pp. 8-13.

[37] R. Wang et al., "Improving 3d surface reconstruction from endoscopic video via fusion and refined reflectance modeling," in Medical Imaging 2017: Image Processing, vol. 10133. International Society for Optics and Photonics, 2017, p. 101330B.

[38] R. Wang et al., "Recurrent Neural Network for Learning Dense Depth and Ego-Motion from Video"," arXiv preprint arXiv:1805.06558, 2018.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for deriving a three-dimensional (3D) textured surface from endoscopic video, the method comprising:

performing video frame preprocessing to identify a plurality of video frames of an endoscopic video, wherein the video frame preprocessing includes informative frame selection, specularity removal, and key-frame selection;

generating, using a neural network or a shape-from-motion-and-shading (SfMS) approach, a three-dimensional (3D) textured surface using the plurality of video frames; and registering the 3D textured surface to at least one computed tomography (CT) image, wherein registering the 3D textured surface to the at least one CT image comprises identifying a tissue-gas surface based on the at least one CT image and performing a surface-to-surface registration between the 3D textured surface and the tissue-gas surface.

2. The method of claim 1 comprising:

marking, via a user interface, a region of interest (ROI) of the 3D textured surface, wherein after registering the 3D textured surface, the ROI is visible on the at least one CT image.

3. The method of claim 1 wherein generating the 3D textured surface comprises:

generating a partial 3D surface for each of the plurality of video frames using the SfMS approach; and fusing, using a group-wise surface registration algorithm and a seamless texture fusion approach, the partial 3D surfaces into the 3D textured surface.

4. The method of claim 1 wherein the SfMS approach comprises:

estimating camera motion and 3D scene structure associated with an input image using a structure-frommotion (SfM) approach or a depth estimation model, wherein the 3D scene structure is parameterized by a SfM point cloud; and generating, using an iterative update scheme, a new estimated 3D surface for the input image after each iteration, wherein the iterative update scheme stops when convergence is reached or another condition is met.

5. The method of claim 4 wherein the depth estimation model utilizes a recurrent neural network.

6. The method of claim 4 wherein the iterative update scheme comprises: during an iteration:

warping an estimated surface to the SfM point cloud associated with the input image;

estimating a reflectance model using this warped surface and the input image; and producing, using the estimated surface and the reflectance model, a new estimated surface using a regularized structure-from-shading (SfS) equation, wherein a subsequent iteration uses the new estimated surface when warping.

7. The method of claim 3 wherein the seamless texture fusion approach comprises:

generating an initial texture for the 3D textured surface by, for each voxel on the 3D textured surface, selecting an image whose partial 3D surface has the closest distance to that voxel to color it; and performing texture fusion by minimizing within-patch and inter-patch differences using an augmented Lagrangian method.

8. The method of claim 1 wherein performing the surface-to-surface registration comprises:

using a thin shell demons (TSD) registration algorithm and applying anisotropic elasticity parameters estimated in a group-wise surface registration to deform the 3D textured surface; and using an expectation-maximization algorithm to align compatible surface regions between the deformed 3D textured surface and the tissue-gas surface.

9. A system for deriving a three-dimensional (3D) textured surface from endoscopic video, the system comprising:

at least one processor; and an endoscopogram generation (EG) module executable by the at least one processor, wherein the EG module is configured for:

performing video frame preprocessing to identify a plurality of video frames of an endoscopic video, wherein the video frame preprocessing includes informative frame selection, specularity removal, and key-frame selection;

generating, using a neural network or a shape-from-motion-and-shading (SfMS) approach, a three-dimensional (3D) textured surface using the plurality of video frames; and registering the 3D textured surface to at least one computed tomography (CT) image, wherein registering the 3D textured surface to the at least one CT image comprises identifying a tissue-gas surface based on the at least one CT image and performing a surface-to-surface registration between the 3D textured surface and the tissue-gas surface.

10. The system of claim 9 wherein the EG module is configured for:

marking, via a user interface, a region of interest (ROI) of the 3D textured surface, wherein after registering the 3D textured surface, the ROI is visible on the at least one CT image.

11. The system of claim 9 wherein generating the 3D textured surface comprises:

generating a partial 3D surface for each of the plurality of video frames using the SfMS approach; and fusing, using a group-wise surface registration algorithm and a seamless texture fusion approach, the partial 3D surfaces into the 3D textured surface.

12. The system of claim 9 wherein the SfMS approach comprises:

estimating camera motion and 3D scene structure associated with an input image using a structure-from-motion (SfM) approach or a depth estimation model, wherein the scene structure is parameterized by a SfM point cloud; and generating, using an iterative update scheme, a new estimated 3D surface for the input image after each iteration, wherein the iterative update scheme stops when convergence is reached or another condition is met.

13. The system of claim 12 wherein the depth estimation model utilizes a recurrent neural network.

14. The system of claim 12 wherein the iterative update scheme comprises: during an iteration:

warping an estimated surface to the SfM point cloud associated with the input image;

estimating a reflectance model using this warped surface and the input image; and producing, using the estimated surface and the reflectance model, a new estimated surface using a regularized structure-from-shading (SfS) equation, wherein a subsequent iteration uses the new estimated surface when warping.

15. The system of claim 11 wherein the seamless texture fusion approach comprises:

generating an initial texture for the 3D textured surface by, for each voxel on the 3D textured surface, selecting an image whose partial 3D surface has the closest distance to that voxel to color it; and performing texture fusion by minimizing within-patch and inter-patch differences using an augmented Lagrangian method.

16. The system of claim 9 wherein performing the surface-to-surface registration comprises:

using a thin shell demons (TSD) registration algorithm and applying anisotropic elasticity parameters estimated in a group-wise surface registration to deform the 3D textured surface; and using an expectation-maximization algorithm to align compatible surface regions between the deformed 3D textured surface and the tissue-gas surface.

17. A non-transitory computer readable medium having stored thereon executable instructions that when executed by a processor of a computer cause the computer to perform steps comprising:

performing video frame preprocessing to identify a plurality of video frames of an endoscopic video, wherein the video frame preprocessing includes informative frame selection, specularity removal, and key-frame selection;

generating, using a neural network or a shape-from-motion-and-shading (SfMS) approach, a three-dimensional (3D) textured surface using the plurality of video frames; and registering the 3D textured surface to at least one computed tomography (CT) image, wherein registering the 3D textured surface to the at least one CT image comprises identifying a tissue-gas surface based on the at least one CT image and performing a surface-to-surface registration between the 3D textured surface and the tissue-gas surface.

18. The non-transitory computer readable medium of claim 17 wherein the executable instructions when executed by the processor of the computer cause the computer to perform steps comprising:

marking, via a user interface, a region of interest (ROI) of the 3D textured surface, wherein after registering the 3D textured surface, the ROI is visible on the at least one CT image.

* * * * *